US012626456B2

(12) United States Patent
Jung et al.

(10) Patent No.: US 12,626,456 B2
(45) Date of Patent: May 12, 2026

(54) ELECTRONIC DEVICE FOR DISPLAYING VIRTUAL OBJECT AND OPERATION METHOD THEREOF

(71) Applicant: Samsung Electronics Co., Ltd., Suwon-si (KR)

(72) Inventors: Woohyun Jung, Suwon-si (KR); Jinwang An, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 259 days.

(21) Appl. No.: 18/527,769

(22) Filed: Dec. 4, 2023

(65) Prior Publication Data

US 2024/0193861 A1 Jun. 13, 2024

Related U.S. Application Data

(63) Continuation of application No. PCT/KR2023/019030, filed on Nov. 23, 2023.

(30) Foreign Application Priority Data

Dec. 8, 2022 (KR) ........................ 10-2022-0170631

(51) Int. Cl.
*G06T 17/00* (2006.01)
*G06V 20/40* (2022.01)
(52) U.S. Cl.
CPC .............. *G06T 17/00* (2013.01); *G06V 20/44* (2022.01)
(58) Field of Classification Search
None
See application file for complete search history.

(56) References Cited

U.S. PATENT DOCUMENTS 6,766,333 B1 7/2004 Wu et al.
2013/0031511 A1 1/2013 Adachi
(Continued)

FOREIGN PATENT DOCUMENTS

KR 10-2003-0005144 A 1/2003
KR 10-1839122 B1 3/2018
(Continued)

OTHER PUBLICATIONS

International Search Report dated Feb. 23, 2024, issued in International Application No. PCT/KR2023/019030.
(Continued)

*Primary Examiner* — Anh-Tuan V Nguyen
(74) *Attorney, Agent, or Firm* — Jefferson IP Law, LLP

(57) ABSTRACT

A first electronic device is provided. The electronic device includes memory, a communication module, a display, and at least one processor. The memory stores at least one instruction configured to cause, when executed by the processor, the first electronic device to, display a first virtual object, identify an input to the first virtual object, transmit information about a first event corresponding to the input to the first virtual object and first identification information of the first electronic device to the server when the first virtual object is in the active state, receive, second identification information of one among multiple electronic devices connected to the server and information about a second event for the first virtual object, and execute the first event when the second identification information corresponds to the first identification information.

19 Claims, 14 Drawing Sheets

(56) References Cited

U.S. PATENT DOCUMENTS

| | | | |
|---|---|---|---|
| 2014/0072243 A1* | 3/2014 | Gao | G06T 11/60 382/300 |
| 2014/0082635 A1* | 3/2014 | Sitrick | G06F 40/103 719/318 |
| 2014/0223335 A1* | 8/2014 | Pearson | G06Q 50/01 715/753 |
| 2017/0060230 A1 | 3/2017 | Faaborg et al. | |
| 2017/0102833 A1* | 4/2017 | Kodali | G06F 9/45504 |
| 2020/0368616 A1 | 11/2020 | Delamont | |
| 2020/0387228 A1 | 12/2020 | Ravasz et al. | |
| 2021/0271881 A1 | 9/2021 | Traynor et al. | |
| 2022/0096929 A1 | 3/2022 | Hariton | |
| 2022/0101593 A1 | 3/2022 | Rockel et al. | |
| 2022/0114792 A1 | 4/2022 | Kawamae et al. | |
| 2022/0121344 A1 | 4/2022 | Pastrana Vicente et al. | |
| 2022/0253149 A1 | 8/2022 | Berliner et al. | |
| 2022/0276765 A1 | 9/2022 | Hlavac et al. | |
| 2024/0094972 A1* | 3/2024 | Zhu | G06F 3/1454 |

FOREIGN PATENT DOCUMENTS

| | | |
|---|---|---|
| KR | 10-2019-0085335 A | 7/2019 |
| KR | 10-2022-0125540 A | 9/2022 |
| WO | 2020/214454 A1 | 10/2020 |

OTHER PUBLICATIONS

European Search Report dated Nov. 4, 2025, issued in European Application No. 23900965.7.

* cited by examiner

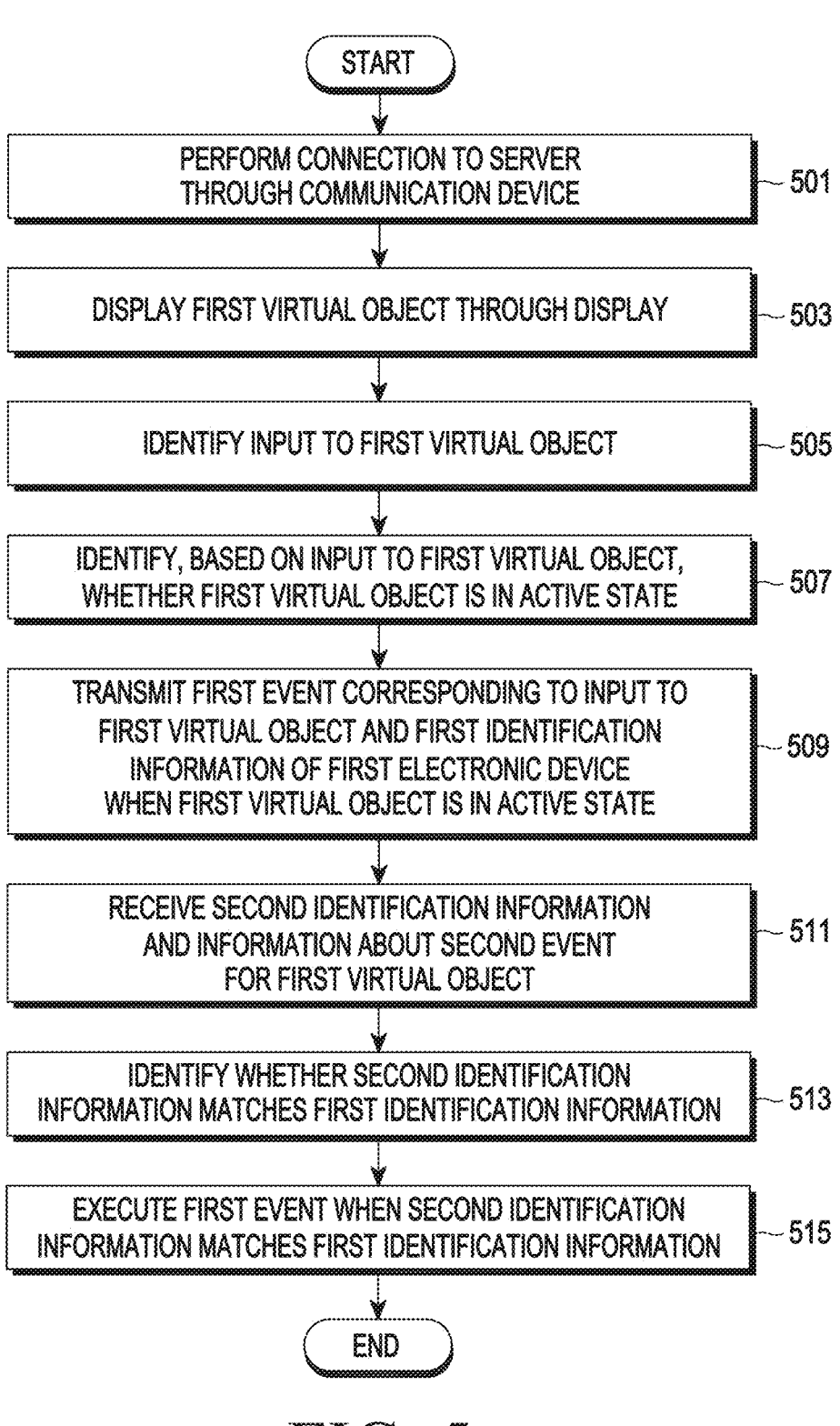

START

PERFORM CONNECTION TO SERVER
THROUGH COMMUNICATION DEVICE ～ 501

DISPLAY FIRST VIRTUAL OBJECT THROUGH DISPLAY ～ 503

IDENTIFY INPUT TO FIRST VIRTUAL OBJECT ～ 505

IDENTIFY, BASED ON INPUT TO FIRST VIRTUAL OBJECT,
WHETHER FIRST VIRTUAL OBJECT IS IN ACTIVE STATE ～ 507

TRANSMIT FIRST EVENT CORRESPONDING TO INPUT TO
FIRST VIRTUAL OBJECT AND FIRST IDENTIFICATION
INFORMATION OF FIRST ELECTRONIC DEVICE
WHEN FIRST VIRTUAL OBJECT IS IN ACTIVE STATE ～ 509

RECEIVE SECOND IDENTIFICATION INFORMATION
AND INFORMATION ABOUT SECOND EVENT
FOR FIRST VIRTUAL OBJECT ～ 511

IDENTIFY WHETHER SECOND IDENTIFICATION
INFORMATION MATCHES FIRST IDENTIFICATION INFORMATION ～ 513

EXECUTE FIRST EVENT WHEN SECOND IDENTIFICATION
INFORMATION MATCHES FIRST IDENTIFICATION INFORMATION ～ 515

END

ELECTRONIC DEVICE FOR DISPLAYING VIRTUAL OBJECT AND OPERATION METHOD THEREOF

CROSS-REFERENCE TO RELATED APPLICATION(S)

This application is a continuation application, claiming priority under § 365(c), of an International application No. PCT/KR2023/019030, filed on Nov. 23, 2023, which is based on and claims the benefit of a Korean patent application number 10-2022-0170631, filed on Dec. 8, 2022, in the Korean Intellectual Property Office, the disclosure of which is incorporated by reference herein in its entirety.

BACKGROUND

Field

The disclosure relates to an electronic device for displaying a virtual object and a method for operating the same.

Description of Related Art

Metaverse-related content is being actively provided. For example, augmented reality-based metaverse-related content in which additional information is superimposed on the real-world environment may be provided. As metaverse-related content is advanced, metaverse services may be accessed by multiple users.

An increasing number of various services and additional functions are being provided through wearable electronic devices such as augmented reality glasses (AR glasses), video see-through (VST) devices, and head-mounted display (HMD) devices. In order to increase the utility value of these electronic devices and satisfy the needs of different users, telecommunications service providers or electronic device manufacturers are competitively developing electronic devices to provide various features and differentiate themselves from other companies. As a result, various functions provided through wearable electronic devices are becoming increasingly advanced.

AR glasses or VR glasses may provide a realistic experience to a user by displaying virtual images while worn on the user's body. AR glasses or video see-through (VST) devices may replace the usability of a smartphone in various fields such as game entertainment, education, and social networking service (SNS). Users may be provided with content similar to reality through AR glasses or the video see-through (VST) devices, and may experience a sensation being in a virtual world through interactions.

The above information is presented as background information only to assist with an understanding of the disclosure. No determination has been made, and no assertion is made, as to whether any of the above might be applicable as prior art with regard to the disclosure.

SUMMARY

Aspects of the disclosure are to address at least the above-mentioned problems and/or disadvantages and to provide at least the advantages described below.

Additional aspects will be set forth in part in the description which follows and, in part, will be apparent from the description, or may be learned by practice of the presented embodiments.

According to an embodiment, a first electronic device may include memory, a communication module, a display, and a processor.

According to an embodiment, the memory stores at least one instruction configured to cause, when executed by the processor, the first electronic device to, perform a connection to a server through the communication module.

According to an embodiment, the memory stores at least one instruction configured to cause, when executed by the processor, the first electronic device to, display a first virtual object through the display, based on information about the first virtual object received from the server.

According to an embodiment, the memory stores at least one instruction configured to cause, when executed by the processor, the first electronic device to, identify a first input to the first virtual object.

According to an embodiment, the memory stores at least one instruction configured to cause, when executed by the processor, the first electronic device to, based on the first input to the first virtual object, identify whether the first virtual object is in an active state.

According to an embodiment, the memory stores at least one instruction configured to cause, when executed by the processor, the first electronic device to, transmit information about a first event corresponding to the first input to the first virtual object and first identification information of the first electronic device to the server when the first virtual object is in the active state.

According to an embodiment, the memory stores at least one instruction configured to cause, when executed by the processor, the first electronic device to, receive, from the server, second identification information of one among a plurality of electronic devices connected to the server and information about a second event for the first virtual object.

According to an embodiment, the memory stores at least one instruction configured to cause, when executed by the processor, the first electronic device to, execute the first event when the second identification information corresponds to the first identification information.

According to an embodiment, a method for operating a first electronic device may include performing a connection to a server through a communication module included in the first electronic device.

According to an embodiment, the method for operating the first electronic device may include displaying a first virtual object through a display included in the first electronic device, based on information about the first virtual object received from the server.

According to an embodiment, the method for operating the first electronic device may include identifying a first input to the first virtual object.

According to an embodiment, the method for operating the first electronic device may include, based on the first input to the first virtual object, identifying whether the first virtual object is in an active state.

According to an embodiment, the method for operating the first electronic device may include transmitting a first event corresponding to a third input to the first virtual object and first identification information of the first electronic device to the server when the first virtual object is in the active state.

According to an embodiment, the method for operating the first electronic device may include receiving, from the server, second identification information of one among a plurality of electronic devices connected to the server and information about a second event for the first virtual object.

According to an embodiment, the method for operating the first electronic device may include executing the first event in case that the second identification information corresponds to the first identification information.

According to an embodiment, a non-transitory computer-readable recording medium may be configured to store at least one instruction to perform a connection to a server through a communication module included in a first electronic device.

According to an embodiment, the non-transitory computer-readable recording medium may be configured to store at least one instruction to display a first virtual object through a display included in the first electronic device, based on information about the first virtual object received from the server.

According to an embodiment, the non-transitory computer-readable recording medium may be configured to store at least one instruction to identify a first input to the first virtual object.

According to an embodiment, the non-transitory computer-readable recording medium may be configured to store at least one instruction to, based on the first input to the first virtual object, identify whether the first virtual object is in an active state.

According to an embodiment, the non-transitory computer-readable recording medium may be configured to store at least one instruction to transmit a first event corresponding to the first input to the first virtual object and first identification information of the first electronic device to the server when the first virtual object is in the active state.

According to an embodiment, the non-transitory computer-readable recording medium may be configured to store at least one instruction to receive, from the server, second identification information of one among a plurality of electronic devices connected to the server and information about a second event for the first virtual object.

According to an embodiment, the non-transitory computer-readable recording medium may be configured to store at least one instruction to execute the first event when the second identification information corresponds to the first identification information.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 5 is a flowchart illustrating a method for operating a wearable electronic device according to an embodiment of the disclosure;

The same reference numerals are used to represent the same elements throughout the drawings.

DETAILED DESCRIPTION

The following description with reference to the accompanying drawings is provided to assist in a comprehensive understanding of various embodiments of the disclosure as defined by the claims and their equivalents. It includes various specific details to assist in that understanding, but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but are merely used by the inventor to enable a clear and consistent understanding of the disclosure. Accordingly, it should be apparent to those skilled in the art that the following description of various embodiments of the disclosure is provided for illustration purposes only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
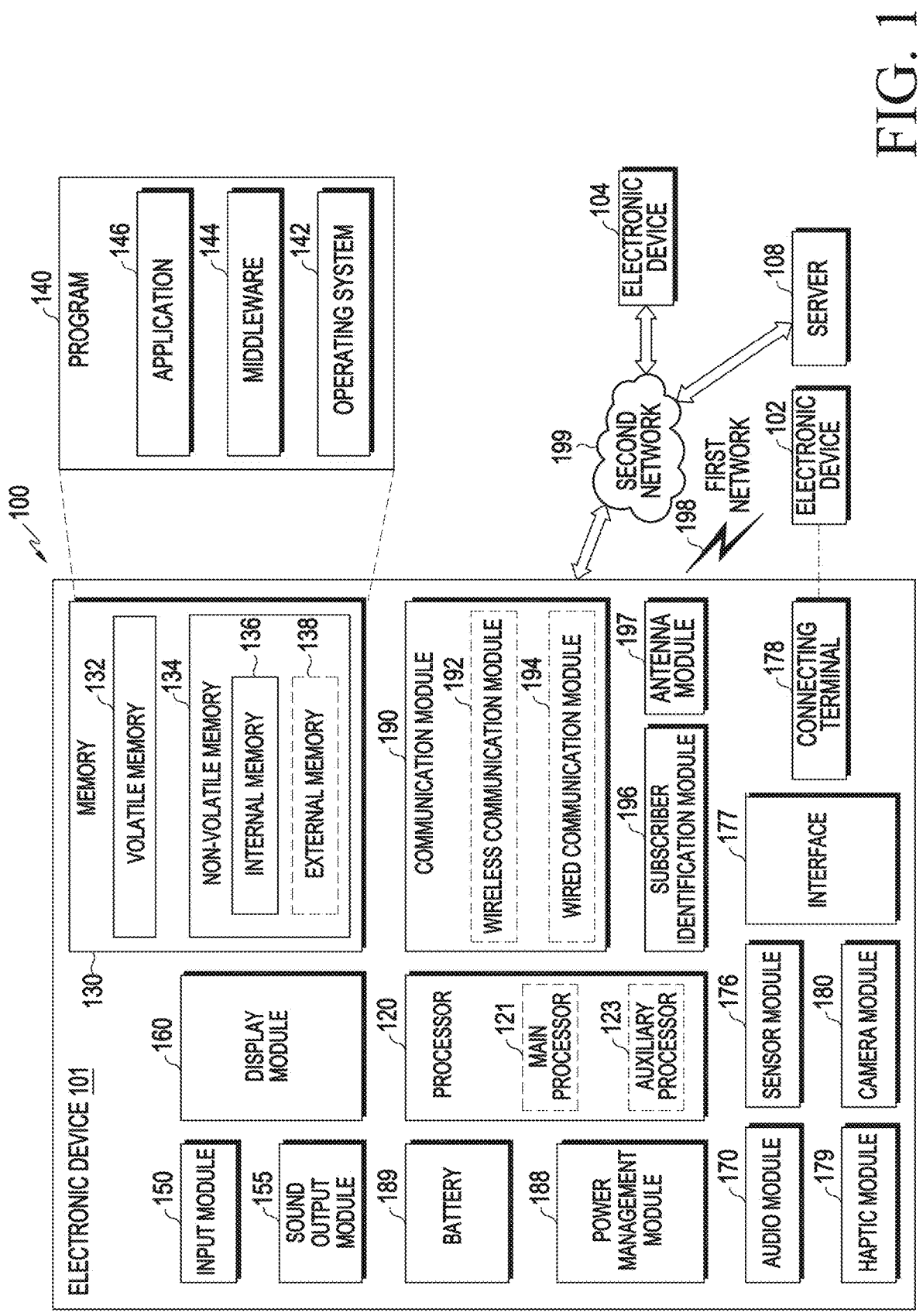
FIG. 1 is a block diagram of an electronic device in a network environment, according to an embodiment of the disclosure.

FIG. 1 is a block diagram illustrating an electronic device 101 in a network environment 100 according to an embodiment of the disclosure.

Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments, at least one of the components (e.g., the connecting terminal 178) may be omitted from the electronic device 101, or one or more other components may be added in the electronic device 101. In some embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted Boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to one embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device 104 via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a fifth-generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a fourth-generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element composed of a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment, the external electronic device 104 may include an internet-of-things (IOT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
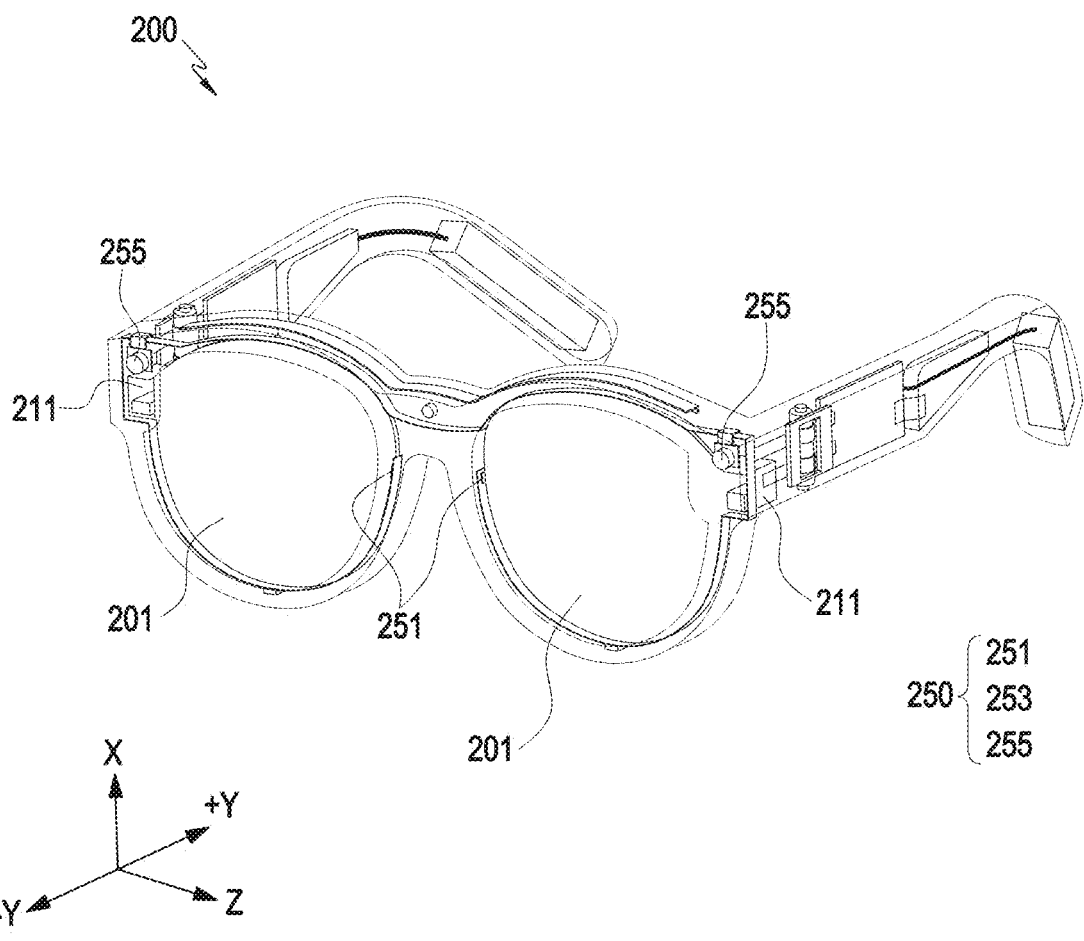
FIG. 2 is a perspective view illustrating the internal configuration of a wearable electronic device according to an embodiment of the disclosure.

FIG. 2 is a perspective view illustrating the internal configuration of a wearable electronic device according to an embodiment of the disclosure.

Referring to FIG. 2, a wearable electronic device 200 according to an embodiment of the disclosure may include at least one among a light output module 211, a display member 201, and a camera module 250.

According to an embodiment of the disclosure, the light output module 211 may include a light source capable of outputting an image and a lens configured to guide the image to the display member 201. According to an embodiment of the disclosure, the light output module 211 may include at least one of a liquid crystal display (LCD), a digital mirror device (DMD), a liquid crystal on silicon (LCoS), an organic light-emitting diode (OLED), or a micro light-emitting diode (micro-LED).

According to an embodiment of the disclosure, the display member 201 may include an optical waveguide (e.g., a wave guide). According to an embodiment of the disclosure, an image incident on the optical waveguide and output by the light output module 211 may be propagated within the optical waveguide and provided to a user. According to an embodiment of the disclosure, the optical waveguide may include at least one of at least one diffractive element (e.g., a diffractive optical element (DOE) or a holographic optical element (HOE)) or a reflective element (e.g., a reflective mirror). For example, the optical waveguide may use the at least one diffractive element or reflective element to guide the image output by the light output module 211 to a user's eye.

According to an embodiment of the disclosure, the camera module 250 may capture a still image and/or a moving image. According to an embodiment, the camera module 250 may be disposed in a lens frame and disposed around the display member 201.

According to an embodiment of the disclosure, a first camera module 251 may capture and/or recognize a trajectory of the user's eyes (e.g., pupils or irises) or gaze. According to an embodiment of the disclosure, the first camera module 251 may periodically or aperiodically transmit information related to the trajectory of the user's eye or gaze (e.g., trajectory information) to a processor (e.g., the processor 120 in FIG. 1).

According to an embodiment of the disclosure, a second camera module 253 may capture an external image.

According to an embodiment of the disclosure, a third camera module 255 may be used to detect and track a hand and to recognize the user's gesture (e.g., hand motion). The third camera module 255 according to an embodiment of the disclosure may be used for 3 degrees of freedom (3 DoF) or 6 DoF head tracking, location (space, environment) recognition, and/or movement recognition. According to an embodiment of the disclosure, the second camera module 253 may also be used to detect and track a hand and to recognize the user's gesture. According to an embodiment, at least one among the first camera module 251 and the third camera module 255 may be replaced by a sensor module (e.g., a LiDAR sensor). For example, the sensor module may include at least one of a vertical cavity surface emitting laser (VCSEL), an infrared sensor, and/or a photodiode.

Figure 3A:
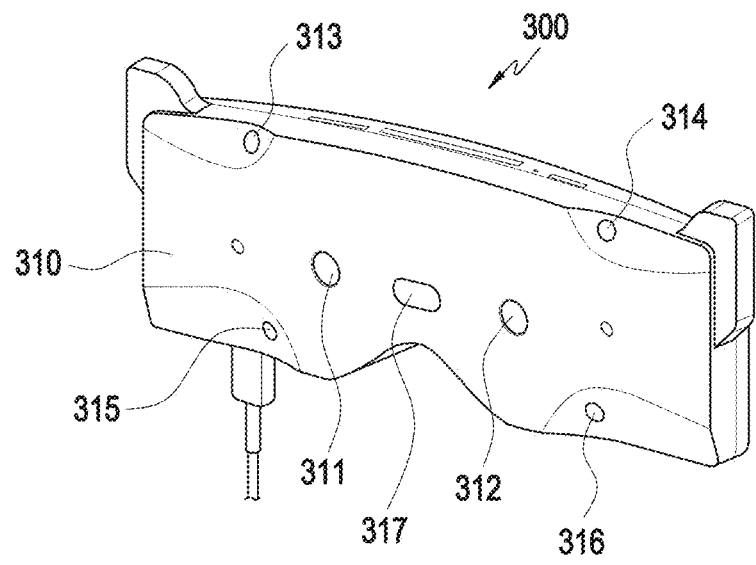
FIGS. 3A and 3B illustrate the front and the rear surfaces of a wearable electronic device according to an embodiment of the disclosure.
Figure 3B:
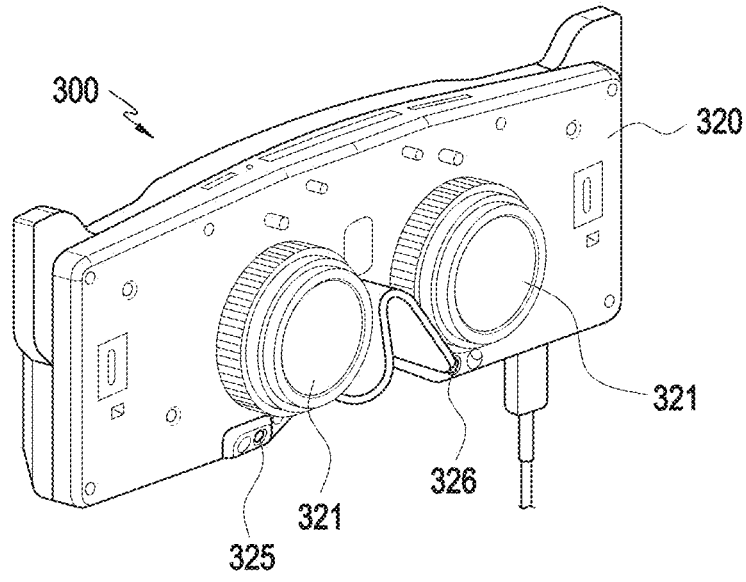

FIGS. 3A and 3B illustrate the front and rear surfaces of a wearable electronic device according to an embodiment of the disclosure.

Referring to FIGS. 3A and 3B, in an embodiment, camera modules 311, 312, 313, 314, 315, and 316 and/or a depth sensor 317 may be disposed on a first surface 310 of a housing so as to acquire information related to the surrounding environment of a wearable electronic device 300.

In an embodiment, the camera modules 311 and 312 may acquire images related to the surrounding environment of the wearable electronic device.

In an embodiment, the camera modules 313, 314, 315, and 316 may acquire images while the wearable electronic device is worn by the user. The camera modules 313, 314, 315, and 316 may be used for hand detection, tracking, and recognition of a user's gesture (e.g., hand motion). The camera modules 313, 314, 315, and 316 may be used for 3 DoF or 6 DoF head tracking, location (space, environment) recognition, and/or movement recognition. In an embodiment, camera modules 311 and 312 may be used for hand detection and tracking, and the user's gesture.

In an embodiment, the depth sensor 317 may be configured to transmit a signal and receive a signal reflected from a subject, and may be used to identify a distance to an object, such as time of flight (TOF). Instead of or in addition to the depth sensor 317, the camera modules 313, 314, 315, and 316 may identify the distance to the object.

According to an embodiment, camera modules 325 and 326 for face recognition and/or a display 321 (and/or a lens) may be disposed on a second surface 320 of the housing.

In an embodiment, the camera modules 325 and 326 for face recognition, adjacent to the display, may be used to recognize a user's face or may recognize and/or track both eyes of the user.

In an embodiment, the display 321 (and/or the lens) may be disposed on the second surface 320 of the wearable electronic device 300. In an embodiment, the wearable electronic device 300 may not include camera modules 315 and 316 among the multiple camera modules 313, 314, 315, and 316. Although not shown in FIGS. 3A and 3B, the wearable electronic device 300 may further include at least one of the elements shown in FIG. 2.

As described above, according to an embodiment, the wearable electronic device 300 may have a form factor to be worn on a user's head. The wearable electronic device 300 may further include a strap and/or a wearing member to be fixed on the user's body part. The wearable electronic device 300, while worn on the user's head, may provide a user experience based on augmented reality, virtual reality, and/or mixed reality.

Figure 4A:
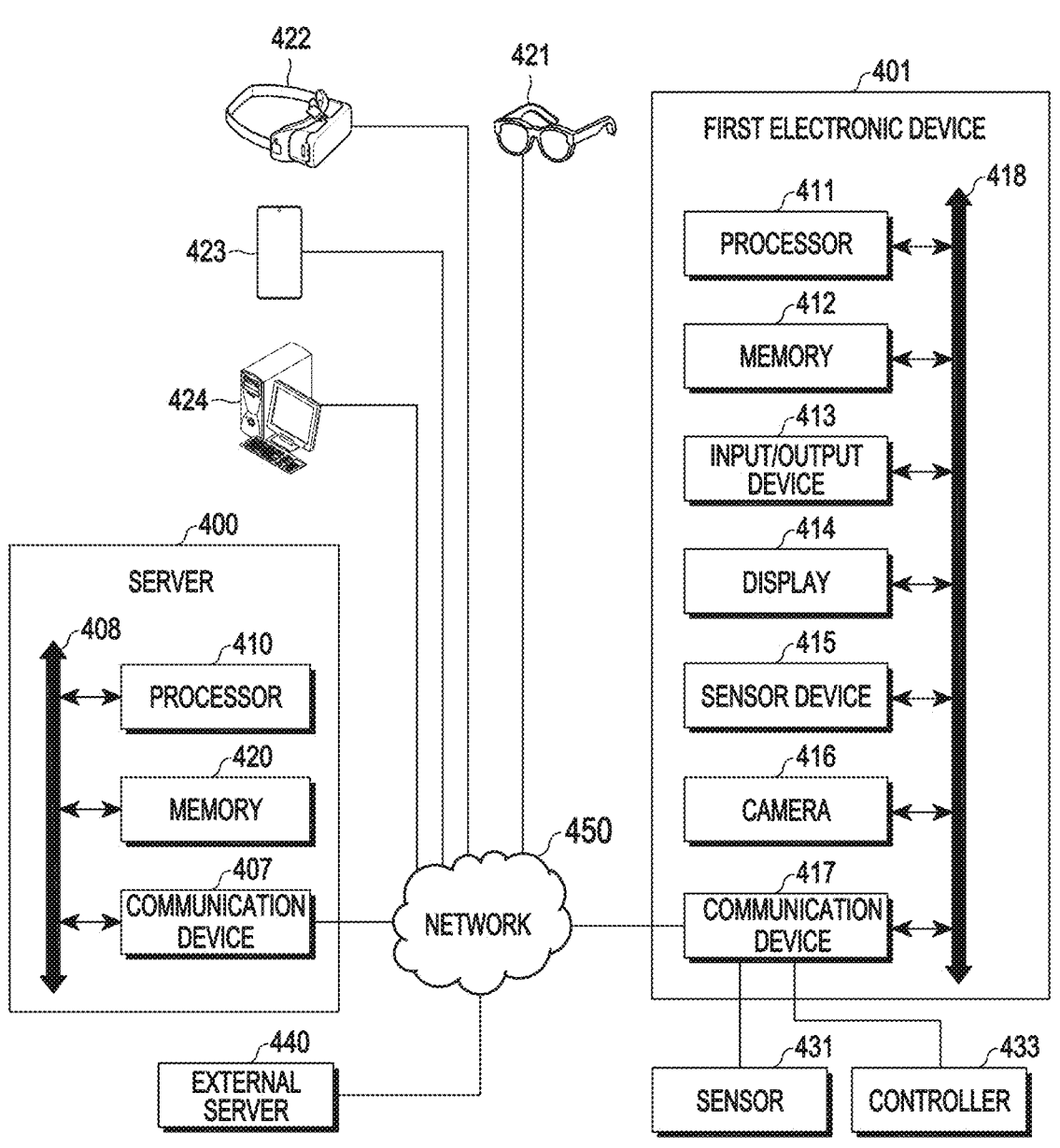
FIG. 4A illustrates an artificial reality providing system according to an embodiment of the disclosure.

FIG. 4A illustrates an artificial reality providing system according to an embodiment of the disclosure.

Referring to FIG. 4A, the artificial reality providing system may include at least one of a server 400, a first electronic device 401, at least one external electronic device 421, 422, 423, or 424, or an external server 440.

According to an embodiment, the server 400 may produce data for representing artificial reality (e.g., at least one among augmented reality (an augmented reality environment) or virtual reality (a virtual reality environment)). In addition to augmented reality or virtual reality, the server 400 may provide content capable of enhancing a user's immersion, and such content may be referred to as content for the metaverse. The server 400 may include a processor 410, a memory 420, and/or a communication device 407. The server 400 including the processor 410, the memory 420, and/or the communication device 407 is merely illustrative, and at least some of operations of the server 400 may be implemented by a cloud server. The server 400 may be implemented as a distributed server, and those skilled in the art will understand that there is no limitation on the implementation form of the server.

According to an embodiment, the processor 410 may execute commands (or instructions) included in a program (or an application) stored in the memory 420. The processor 410 may include, for example, a central processing unit (CPU), a graphics processing unit (GPU), a neural processing unit (NPU), a tensor processing unit (TPU), a digital signal processor (DSP), and an application-specific integrated circuit (ASIC), a field-programmable gate array (FPGA), and/or a programmable logic device, but any means capable of executing a program (or an instruction or a command) may be included without limitation. The processor 410 may execute a program for artificial reality. The memory 420 may store a program for artificial reality. According to an embodiment, the memory 420 may include volatile memory and/or non-volatile memory, and may include, for example, but is not limited to, for example, a hard disk storage device, RAM, ROM, and/or flash memory which are illustrative. The program for artificial reality, as a program for a server, may cause, for example, the generation of data to represent the artificial reality, the provision of the generated data, the verification of user input, and/or the generation and provision of updated data to represent the artificial reality based on the verified user input, and may include commands (or instructions) corresponding to at least some of the operations performed by the server 400 of the disclosure. The communication device 407 may assist in establishing a communication channel between the server 400 and the first electronic device 401 through a network 450 and performing communication through the established communication channel. The communication device 407 may be, but is not limited to, a device capable of providing a wide area network (e.g., the Internet). The operations performed by the server 400 may be performed, for example, by the processor 410, or by other hardware under the control of the processor 410. The commands (or instructions) causing the operations to be performed by the server 400 may be stored in the memory 420. The processor 410, the memory 420, and/or the communication device 407 may send and receive data through a bus 408 (or, a communication interface or a network) of the server 400.

According to an embodiment, the first electronic device 401 may use the data for representing the artificial reality to perform at least one operation for representing the artificial reality, (e.g., which may include, but is not limited to, providing visual content (e.g., an image), providing auditory content (e.g., a voice), providing tactile content (e.g., a vibration), and/or providing olfactory content (e.g., an odor). A user who owns or wears the first electronic device 401 may experience artificial reality based on content provided by the first electronic device 401. The first electronic device 401 may include at least one of a processor 411, a memory 412, an input/output device 413, a display 414, a sensor device 415, a camera 416, or a communication device 417. The processor 411 may include, for example, CPU, GPU, NPU, TPU, DSP, ASIC, FPGA, and/or a programmable logic device, but any means capable of executing a program (or an instruction or a command) may be included without limitation. For example, the processor 411 may execute a program for artificial reality. The program for artificial reality, as a client program, may cause, for example, the reception of data for representing the artificial reality from the server 400, the carrying-out of at least one operation for representing the artificial reality based on the received data (e.g., which may include, but is not limited to, providing visual content (e.g., an image), providing auditory content (e.g., a voice), providing tactile content (e.g., a vibration), and/or providing olfactory content (e.g., an odor)), the identification of user input, and/or the transmission of the user input (or a command corresponding to the user input) to the server, and performing the server 400. In addition, the program for artificial reality may include commands (or instructions) corresponding to at least some of operations performed by the first electronic device 401 of the disclosure. According to an embodiment, the memory 412 may include volatile memory and/or non-volatile memory, and may include, but is not limited to, for example, a hard disk storage device, RAM, ROM, and/or flash memory which are illustrative.

According to an embodiment, the input/output device 413 may include a touch pad, a button, a mouse, a digital pen, and/or a microphone, but any device for receiving (or sensing) a user input may be included without limitation. For example, a touch screen panel, which is an example of the input/output device 413, may be implemented integrally with the display 414. The input/output device 413 may include a speaker, a haptic module, and/or a light-emitting module, but any device for outputting content related to artificial reality may be included without limitation.

According to an embodiment, the sensor device 415 may include a gesture sensor, a gyro sensor, a barometric pressure sensor, a magnetic sensor, an acceleration sensor, a grip sensor, a proximity sensor, a color sensor, an infrared (IR) sensor, a biometric sensor, a temperature sensor, and a humidity sensor, and/or an illuminance sensor. According to an embodiment, the camera 416 may include one or more lenses, image sensors, image signal processors, or flashes.

According to an embodiment, the communication device 417 may support establishing a communication channel between the server 400 and the first electronic device 401 through the network 450 and performing communication through the established communication channel. The communication device 417 may be, but is not limited to, a device capable of providing a wide area network (e.g., the Internet). The communication device 417 may support wired and/or wireless communications. For example, the communication device 417 may support short-range communication (e.g., short-range communication such as Bluetooth, wireless fidelity (Wi-Fi) direct, or infrared data association (IrDA)). The communication device 417 may transmit and receive data to and from an external sensor 431 and/or an external controller 433, based on short-range communication. For example, when the first electronic device 401 is implemented as a standalone type, the communication device 417 may support a function of wirelessly accessing the network 450. The communication device 417 may support cellular communication, such as LTE, 5G, or 6G, and/or IEEE 802 series-based communication (which may be named Wi-fi, for example). The communication device 117 may be implemented to support wired communication, and the implementation method thereof is not limited. When the first electronic device 401 is implemented as a non-standalone type, the first electronic device 401 may communicate with the server 400 through a relay device connectable to the network 450. In this case, the communication device 417 may support short-range communication such as Bluetooth, wireless fidelity (Wi-Fi) direct, or infrared data association (IrDA), and may use short-range communication to communicate with the server 400 through the relay device. The external sensor 431 may include a gesture sensor, a gyro sensor, a barometric pressure sensor, a magnetic sensor, an acceleration sensor, a grip sensor, a proximity sensor, a color sensor, an IR sensor, a biometric sensor, a temperature sensor, a humidity sensor, and/or an illuminance sensor.

The operations performed by the first electronic device 401 may be performed, for example, by the processor 411, or by other hardware under the control of the processor 411. Commands (or instructions) causing the operations to be performed by the first electronic device 401 may be stored in the memory 412. The processor 411, the memory 412, the input/output device 413, the display 414, the sensor device 415, the camera 416, and/or the communication device 417 may transmit/receive data through a bus 418 (or a communication interface or a network) of the first electronic device 401. The transmitting and receiving of data by the server 400 and the first electronic device 401 based on an application for artificial reality is merely illustrative, and those skilled in the art will understand that the server 400 and the first electronic device 401 may also transmit and receive at least some of data on a web basis.

According to an embodiment, the external sensor 431 may be, for example, a ring-type device, a bracelet-type device, or a head-mounted device, but the type of the external sensor 431 and/or the user's body part to which the external sensor 431 is attached are not limited. The external sensor 431 may provide sensed data to the first electronic device 401 based on short-range communication. The controller 433 may include, for example, a touch pad, a button, a mouse, a digital pen, and/or a microphone, but any device for receiving (or sensing) a user input may be included without limitation. The controller 433 may provide the acquired data to the first electronic device 401 based on short-range communication. In an embodiment, the controller 433 may further include at least one sensor in addition to the device for receiving a user input. In this case, the controller 433 may provide sensing data and/or data associated with the user input to the first electronic device 401 based on short-range communication.

According to an embodiment, the server 400 may transmit and receive data to and from the at least one external electronic device 421, 422, 423, or 424. The server 400 may transmit, to the first electronic device 401, data for representing artificial reality updated and/or changed based on data from the at least one external electronic device 421, 422, 423, or 424. The first electronic device 401 may perform at least one operation for representing the artificial reality based on the data. Thus, when there are multiple users in one artificial reality, an artificial reality reflecting the behavior of one user may be provided to other users.

According to an embodiment, the external server 440 may transmit and receive data to and from the server 400 over the network 450. The external server 440 may be, for example, a server that supports the same application (or the same artificial reality) as the server 400. Alternatively, the external server 440 may be a server that supports a different application (or a different artificial reality) from the server 400. In this case, the server 400 may convert the data from the external server 440 into the format of an application (or artificial reality) supported by the server 400. The server 400 may transmit, to the first electronic device 401, data for representing artificial reality reflecting the converted data. As described above, the server 400 may also interact with artificial reality that is different from artificial reality supported thereby, and this function may be referred to as a multiverse function.

According to an embodiment, the first electronic device 401 may be a head-mounted device (HMD) for supporting virtual reality, or a smartphone connectable to a structure that is fixable to the head. While wearing the HMD on the head or the structure to which the smartphone is connected on the head, the user may binocularly observe a left-eye image and a right-eye image for representing virtual reality displayed on the display 414. Alternatively, the user may observe images for representing virtual reality displayed on the display 414 of the first electronic device 401 without wearing the first electronic device 401 on the head. In this case, the first electronic device 401 may be implemented as, but is not limited to, a smartphone, a tablet, a general-purpose computer, or a smart mirror.

According to an embodiment, the server 400 may produce data for representing at least one space of virtual reality (or a scene of viewing the space). For example, the server 400 may receive first user information (e.g., account information and/or authentication information of a first user) from the first electronic device 401. Based on the first user information, the server 400 may perform a login procedure for the first user. The server 400 may identify a space corresponding to the first user in the virtual reality. For example, the server 400 may identify a space privately allocated to the first user. For example, the server 400 may identify a space corresponding to the first user's location from among opened spaces. For example, the server 400 may identify a space corresponding to the user's input.

There are no limitations on how the server 400 identifies the space corresponding to the first user's location. For example, the identified space may include at least one object and/or an avatar (or a character) corresponding to the user. When the viewpoint of a scene is a first-person viewpoint, data for representation may relate to the scene in which the identified space is viewed from the user's viewpoint. In some cases, the scene in which the identified space is viewed may not include an avatar (or a character) corresponding to the first user, or may include only a part (e.g., a hand, etc.) of the body, but is not limited thereto. Alternatively, a back view of the avatar may be included. When the viewpoint of the scene is third-person viewpoint, data for representation may relate to a scene in which a space including the avatar (or character) corresponding to the user is viewed from one direction.

According to an embodiment, the scene viewed from the user's viewpoint may include an avatar corresponding to another user. For example, a second user may access the server 400 by using the external electronic device 422. The server 400 may produce data for representing artificial reality used by both the first user and the second user. For example, when both the first user and the second user are present in a particular space, the server 400 may produce data for representing artificial reality that is used by both the first user and the second user. For example, when the viewpoint of a scene is a first-person viewpoint, a scene for the first user may include at least a part of an avatar of the second user. For example, when the viewpoint of a scene is a third-person viewpoint, a scene for the first user may include at least a part of a first avatar (or a character) corresponding to the first user and/or at least a part of a second avatar (or a character) corresponding to the second user. In an embodiment, at least a part of a screen displayed on the first electronic device 401 may be provided to the server 400. At least a part of the screen displayed on the first electronic device 401 (or an object corresponding to at least a part of the screen) may be disposed in a virtual reality space.

According to an embodiment, the server 400 may receive a user input and/or a command corresponding to the user input from the first electronic device 401. For example, the first electronic device 401 may identify the user input through the input/output device 413. For example, the first electronic device 401 may identify the user input through the built-in sensor device 415. For example, the first electronic device 401 may acquire the user input from the external sensor 431 and/or the controller 433 connected through the communication device 417. The processor 411 may identify, based on sensing data identified through the sensor device 415, that movement information of the first electronic device 401 is the user input.

According to an embodiment, the first electronic device 401 may identify a command based on a user input. The command may include, for example, but is not limited to, movement within virtual reality, designation of an object within the virtual reality, manipulation of an object within the virtual reality, and/or interaction with another avatar. The first electronic device 401 may transmit the command to the server 400. For example, the first electronic device 401 may transmit the user input to the server 400 without identifying the command based on the user input, in which case the server 400 may identify the command based on the user input.

According to an embodiment, based on the command, the server 400 may update the virtual reality space, or may change the virtual reality space to a different space. For example, when the command is the designation of an object, the space may be updated to reflect a function associated with the designated object. For example, when the command is manipulation of an object, the space may be updated to change the location of the object. For example, when the command is to perform an action on an avatar, the space may be updated so that the user's avatar performs a corresponding reaction. For example, when the command is an interaction with another avatar, the space may be updated so that the avatar performs a corresponding reaction. For example, when the command is movement, the space for display may be changed to a different space.

Those skilled in the art will understand that there are no limitations on updating and/or changing the virtual reality space based on the command. In addition to updating and/or changing visual content, the server 400 may provide auditory content, provide tactile content, and/or provide olfactory content. The server 400 may relay voice data and/or text for chatting between users. For example, the server 400 may update and/or change the space by using information about the association between the command and the update and/or change. For example, the server 400 may store an artificial intelligence model that receives a user input and/or a command as an input value and outputs the update and/or change of a space as an output value. The server 400 may perform updates and/or changes to the space based on the output of the artificial intelligence model. For example, the server 400 may store an artificial intelligence model that updates and/or changes a space based on the context of the space without any user input. The server 400 may use the artificial intelligence model to update and/or change a space based on the context of the space.

According to an embodiment, the server 400 may transmit data for representation of the updated space and/or data for representation of the changed space to the first electronic device 401. The server 400 may transmit the data for the representation of the updated space and/or the data for the representation of the changed space to the external electronic device 422 corresponding to the second user. Accordingly, on the external electronic device 422, virtual reality reflecting the space updated by the first user of the first electronic device 401 may be represented. Furthermore, based on information (e.g., a user input and/or a command) transmitted to the server 400 from the external electronic device 422, the server 400 may update the space which the first user and the second user use (or are present in) together. The server 400 may transmit data for representing the updated space to the first electronic device 401. The first electronic device 401 may represent the updated space, based on the received data.

As described above, the server 400 may share an updated space corresponding to one user with electronic devices of other users corresponding to the space. For example, time-series update and/or change of a space may be named a user experience. The server 400 and/or the first electronic device 401 may store at least one piece of data associated with the user experience in the memory 420 and/or 412. For example, the server 400 may store at least one piece of data associated with the user experience on a per-user basis (e.g., per user account). For example, the server 400 and/or the first electronic device 401 may store, in the memory 420 and/or 412, data for representing a point in time during the user experience. For ease of description, this may be described as performing a capture of the user experience.

The server 400 may store data associated with the user experience, and this may be referred to as life logging. The server 400 may additionally store data associated with a user. For example, the server 400 may receive at least one piece of sensing data from the first electronic device 401 and store the same in time series, or update a final value. Based on the at least one piece of sensing data, the server 400 may produce a user (e.g., an avatar) in virtual reality that corresponds to the user in the real world, and this may be referred to as a digital twin.

According to an embodiment, the first electronic device 401 may provide content for augmented reality that represents at least one visual object that may be superimposed on a real-world environment viewed by a particular user. Those skilled in the art will understand that at least some of the operations of the server 400 and/or the first electronic device 401 described in embodiments regarding virtual reality may also be performed by the server 400 and/or the first electronic device 401 described in embodiments regarding augmented reality, and vice versa. According to an embodiment, the first electronic device 401 may be a glasses-type electronic device for supporting augmented reality, a smart lens, or a smartphone capable of displaying a captured image in real time. A user, while wearing a glasses-type electronic device or a smart lens, may observe a visual object displayed on a transparent display (or a semi-transparent display) of the glasses-type electronic device or the smart lens along with the real-world environment. Alternatively, a user may observe an image captured by a smartphone and a visual object displayed to be superimposed on the image.

According to an embodiment, the first electronic device 401 may acquire a foreground image through the camera 416 (e.g., a camera oriented toward the front). The first electronic device 401 may transmit the foreground image, a part of the foreground image, or 3D modelling data acquired based on the foreground image to the server 400 through the communication device 417. The first electronic device 401 may identify the orientation of the first electronic device 401 based on a captured image and/or sensing data by the sensor device 415. The first electronic device 401 may transmit data about the orientation of the first electronic device 401 through the communication device 417. The first electronic device 401 may acquire an image of the user's eyes by using the camera 416 (e.g., a camera oriented toward the rear). The first electronic device 401 may identify the user's gaze based on the captured image of the eyes. The first electronic device 401 may transmit data about the user's gaze through the communication device 417.

According to an embodiment, the server 400 may produce data for representing at least one visual object, which may be superimposed on the real-world environment as viewed by a particular user, as data for representing artificial reality. The server 400 may analyze, for example, data (e.g., data associated with the foreground image, the orientation of the first electronic device 401, and/or the user's gaze) received from the first electronic device 401, and may identify at least one visual object based on the result of the analysis. The server 400 may transmit data for representing the at least one visual object to the first electronic device 401 through the communication device 407. The at least one visual object may be displayed, for example, by the display 414 of the first electronic device 401, and the user may observe the at least one visual object superimposed on the real-world environment. For example, a visual object may have information and/or a shape that is associated with an object being placed in the real-world environment. In this case, the first electronic device 401 may display the visual object so that the visual object can be observed by the user, as in the case in which the visual object is located in the vicinity of the object being placed in the real environment.

According to an embodiment, the first electronic device 401 may identify a user input. For example, the user input may be identified through the input/output device 413 included in the first electronic device 401 and/or through the external sensor 431 and/or the controller 433. The user input may cause, for example, the designation and/or manipulation of a displayed visual object. The first electronic device 401 may transmit the user input and/or a command corresponding to the user input to the server 400. The server 400 may, based on the user input and/or the command corresponding to the user input, produce data for representing artificial reality. For example, the server 400 may identify that the user input is based on the designation and/or manipulation of a visual object and, in response thereto, may transform the visual object, move the visual object, and/or provide another visual object that corresponds to the function of the visual object, but there is no restriction on performing the operations. The server 400 may transmit, to the first electronic device 401, the data for representing artificial reality produced based on the user input and/or the command corresponding to the user input. The first electronic device 401 may provide, based on the data for representing artificial reality, content associated with the artificial reality. As described above, the server 400 and/or the first electronic device 401 may provide a function enabling the user to interact with the visual object.

In an embodiment, the server 400 may produce an avatar (or a character) corresponding to another user as the data for representing artificial reality. The server 400 may transmit the avatar (or the character) corresponding to the other user to the first electronic device 401. The first electronic device 401 may display the avatar (or the character) corresponding to the other user by using the received data for representing artificial reality. Accordingly, the user may observe the avatar (or the character) corresponding to the other user that is superimposed on the real-world environment. Accordingly, the user may experience the avatar (or the character) corresponding to the other user as being located in the real-world environment. The avatar (or the character) corresponding to the other user may be manipulated, for example, by a user input acquired from the external electronic device 421, 422, 423, or 424, and/or may be manipulated based on the artificial intelligence model stored in the server 400. There is no limitation on how to manipulate the avatar (or the character). Based on the manipulation of the avatar (or the character), the server 400 may transmit data for representing the manipulated avatar (or character) to the electronic device 401. The first electronic device 401 may express the manipulated avatar (or character), based on the received data, and accordingly, the user may experience the avatar (or character) corresponding to the other user as acting in the real-world environment.

As described above, the server 400 and/or the first electronic device 401 may store a user experience associated with augmented reality in the memory 420 and/or 412. For example, the server 400 may store at least one piece of data, which is associated with the user experience associated with the augmented reality, on a per-user basis (e.g., per user account). For example, the server 400 and/or the first electronic device 401 may store, in the memory 420 and/or 412, data for a representation of a point in time during the user experience associated with the augmented reality.

It is exemplary that the server 400 and the first electronic device 401 may produce data for representing artificial reality to represent the artificial reality. According to an embodiment, the first electronic device 401 may produce data for representing artificial reality, and/or may produce data for artificial realty based on data from external electronic device 421, 422, 423, or 424. In this case, the first electronic device 401 may produce the data for representing artificial reality without data from the server 400.

Figure 4B:
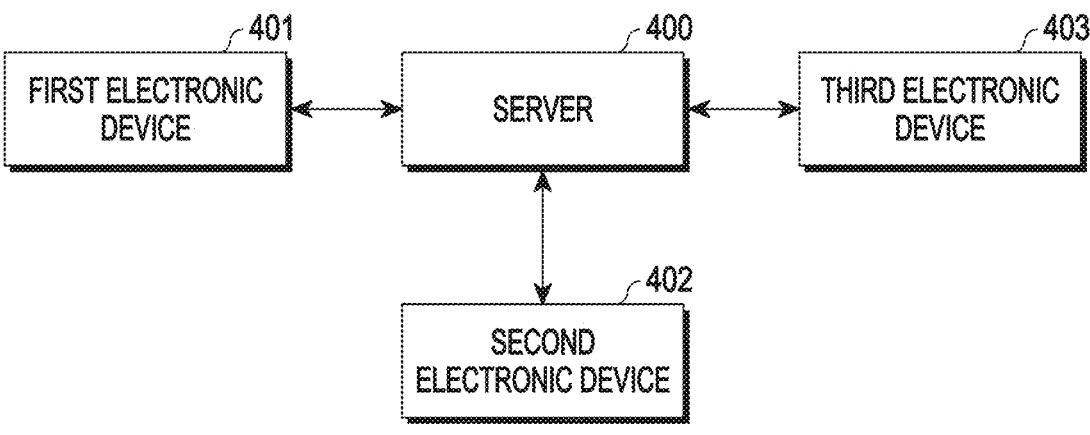
FIG. 4B illustrates an artificial reality providing system in which at least one electronic device is communicatively connected to a server according to an embodiment of the disclosure.

FIG. 4B illustrates an artificial reality providing system in which at least one electronic device is communicatively connected to a server according to an embodiment of the disclosure.

Referring to FIG. 4B, according to an embodiment, a first electronic device 401 may connect to a server 400 through a communication device 417 (e.g., the communication device 417 in FIG. 4A). According to an embodiment, a second electronic device 402 may be connected to the server 400 through a communication device of the second electronic device 402, and a third electronic device 403 may be connected to the server 400 through a communication device of the third electronic device 403. For example, the first electronic device 401, the second electronic device 402, and the third electronic device 403 may be connected to the server 400 based on various communication methods.

According to an embodiment, the first electronic device 401, the second electronic device 402, and the third electronic device 403 may be implemented as any one of a smartphone, augmented reality (AR) glasses, or a video see-through (VST) device.

According to an embodiment, a processor 411 (e.g., the processor 411 in FIG. 4A) may display a first virtual object through a display 414 (e.g., the display 414 in FIG. 4A).

According to an embodiment, the processor 411 may identify an input to the first virtual object. According to an embodiment, the input to the first virtual object may include an input by any one of touch, tap, multi-tap, long tap, drag, or drag and drop. However, this is an example, and embodiments of the disclosure may include various types of inputs.

According to an embodiment, the processor 411 may identify, based on the input to the first virtual object, whether the first virtual object is in an active state. According to an embodiment, the processor 411 may identify that the first virtual object is in an active state, based on not receiving event information corresponding to inputs to the first virtual object by multiple electronic devices (e.g., the second electronic device 402 and the third electronic device 403) connected to the server 400. According to an embodiment, executing an event for the first virtual object may imply that the first virtual object is selected based on the input to the first virtual object.

According to an embodiment, when the first virtual object is in an active state, the processor 411 may transmit, to the server 400, information about a first event corresponding to the input to the first virtual object and first identification information of the first electronic device 401. According to an embodiment, the information about the first event may imply an input to the first virtual object. According to an embodiment, the first identification information may imply unique identification (ID) information of the first electronic device 401 that is capable of distinguishing the first electronic device 401 from the remaining electronic devices, other than the first electronic device 401, among multiple electronic devices connected to the server 400.

According to an embodiment, the processor 411 may receive, from the server 400, second identification information of one of the multiple electronic devices connected to the server 400 and information about a second event for the first virtual object. According to an embodiment, the information about the second event may imply the start of the input to the first virtual object or the end of the input to the first virtual object.

According to an embodiment, the processor 411 may identify whether the second identification information matches the first identification information.

According to an embodiment, when the second identification information matches the first identification information, the processor 411 may identify that the first electronic device 401 among the multiple electronic devices connected to the server 400 has first requested an input to the first virtual object.

According to an embodiment, the processor 411 may execute the first event when the second identification information matches the first identification information. According to an embodiment, the execution of the first event may imply that the first virtual object is selected based on the input to the first virtual object.

According to an embodiment, when the second identification information does not match the first identification information, the processor 411 may identify that one of the remaining multiple electronic devices connected to the server 400, other than the first electronic device 401, has been first requested an input to the first virtual object.

According to an embodiment, when it is identified that the second electronic device 402 requested an input to the first virtual object before the first electronic device 401, the first electronic device 401 may identify, based on the information about the second event, whether the input to the first virtual object by the second electronic device 402 has ended. According to an embodiment, the information about the second event may include information about the end of the input to the first virtual object by the second electronic device 402.

According to an embodiment, when it is identified that the input to the first virtual object by the second electronic device 402 has not ended the processor 411 may display the first virtual object in an inactive state through the display 414. According to an embodiment, the inactive state may refer to a state in which the processor 411 does not execute an event for the first virtual object even when the input to the first virtual object is identified.

According to an embodiment, the processor 411 may display the first virtual object in an active state through the display 414 when it is identified that the input to the first virtual object by the second electronic device 402 has ended. According to an embodiment, when a reinput to the first virtual object is identified, the processor 411 may execute an event corresponding to the reinput to the first virtual object. For example, the event corresponding to the reinput may imply that the first virtual object is selected based on the reinput.

According to an embodiment, the processor 411 may visually differentiate the first virtual object depending on whether the first virtual object is in an active state and display the same through the display 414. For example, the processor 411 may adjust a preconfigured reference brightness, reference shade, reference color, and/or reference transparency to display the first virtual object in an inactive state. However, this is an example, and in embodiments of the disclosure, the first virtual object may be displayed in an inactive state in a variety of ways.

According to an embodiment, the server 400 may store the identification information of the multiple electronic devices connected to the server 400 in a memory 420 (e.g., the memory 420 in FIG. 4A) in the chronological order in which the identification information is received. For example, the memory 420 may be implemented as a queue. According to an embodiment, when it is identified that the second electronic device 402 among the multiple electronic devices connected to the server 400 has requested an input to the first virtual object before the first electronic device 401, the processor 411 may display the first virtual object in a waiting state through the display 414 to indicate waiting for execution of the first event.

According to an embodiment, in the waiting state, the processor 411 may display second identification information of the second electronic device 402, which requested an input to the first virtual object before the first electronic device 401, around the first virtual object through the display 414. According to an embodiment, when the end of the input to the first virtual object by the second electronic device 402 is identified, the processor 411 may display the first virtual object in an active state through the display 414. For example, in the active state, the processor 411 may display the first virtual object with the second identification information deleted. According to an embodiment, when a reinput to the first virtual object is identified, the processor 411 may execute an event corresponding to the reinput to the first virtual object.

In addition, according to an embodiment, an event for the first virtual object may be simultaneously executed by multiple electronic devices connected to the server 400. For example, the event for the first virtual object may refer to an event related to a writing action using a virtual pointer displayed through a display. For example, when the multiple electronic devices execute an event related to a writing action using the virtual pointer, a written content may be shared through displays of the multiple electronic devices.

According to an embodiment, the processor 411 may receive, from the server 400, first multiple pieces of identification information of the multiple electronic devices. For example, the first multiple pieces of identification information may be identification information corresponding to multiple electronic devices in which an input to the first virtual object has been identified. According to an embodiment, the processor 411 may identify, from among the first multiple pieces of identification information, identification information which matches the first identification information of the first electronic device 401. According to an embodiment, the processor 411 may execute the first event when the identification information matching the first identification information of the first electronic device 401 is identified from among the first multiple pieces of identification information.

According to an embodiment, the server 400 may receive information, indicating that the execution of the event for the first virtual object has ended, from at least one electronic device, among the multiple electronic devices, in which an input to the first virtual object has ended. According to an embodiment, when identification information matching the first identification information is not identified from among the first multiple pieces of identification information, the processor 411 may receive, from the server 400, second multiple pieces of identification information of the multiple electronic devices, excluding the identification information of the at least one electronic device, among the multiple electronic devices, in which the input to the first virtual object has ended.

According to an embodiment, the processor 411 may receive, from the server 400, information indicating whether the number of second multiple pieces of identification information is less than a predetermined number. According to an embodiment, when the number of second multiple pieces of identification information is less than the predetermined number, the processor 411 may display the first virtual object in an active state through the display 414. According to an embodiment, the predetermined number may refer to the number of multiple electronic devices capable of simultaneously executing an event for the first virtual object.

According to an embodiment, when the number of second multiple pieces of identification information is greater than the predetermined number, the processor 411 may display the first virtual object in an inactive state through the display 414.

Operations of the first electronic device 401, described with reference to the drawings below, may be performed by the processor 411. However, for ease of description, the operations performed by the processor 411 will be described as being performed by the first electronic device 401.

The second electronic device 402 and the third electronic device 403 may perform the same operations as the first electronic device 401 described above. However, a description of the operations performed by the second electronic device 402 and the third electronic device 403 is redundant, and thus will be omitted. The first electronic device 401, the second electronic device 402, and the third electronic device 403 may perform the above-described operations of the server 400. However, the description of the first electronic device 401, the second electronic device 402, and the third electronic device 403 performing the operations of the server 400 described above is redundant, and thus will be omitted.

FIG. 5 is a flowchart illustrating a method for operating a first electronic device according to an embodiment of the disclosure.

Referring to FIG. 5, an embodiment describes a case where only one of multiple electronic devices connected to a server 400 may execute, based on an input to a first virtual object, an event for the first virtual object at a particular time.

According to an embodiment, in operation 501, a first electronic device 401 (e.g., the first electronic device 401 in FIG. 4A) may be connected to the server 400 (e.g., the server 400 in FIG. 4A) through the communication device 417 (e.g., the communication device 417 in FIG. 4A).

According to an embodiment, in operation 503, the first electronic device 401 may display, based on information about the first virtual object received from the server 400, the first virtual object through a display 414 (e.g., the display 414 in FIG. 4A).

According to an embodiment, in operation 505, the first electronic device 401 may identify an input to the first virtual object. According to an embodiment, the input to the first virtual object may include an input by any one of touching, tapping, multi-tapping, long-tapping, dragging, or dragging and dropping on the first virtual object. In addition, the input to the first virtual object may be implemented in various types of input.

According to an embodiment, in operation 507, the first electronic device 401 may identify, based on the input to the first virtual object, whether the first virtual object is in an active state. According to an embodiment, the first electronic device 401 may identify that the first virtual object is in an active state, based on not receiving event information corresponding to inputs for the first virtual object by multiple electronic devices connected to the server 400.

According to an embodiment, in operation 509, the first electronic device 401 may transmit information about a first event corresponding to the input to the first virtual object and first identification information of the first electronic device 401 to the server 400 when the first virtual object is in an active state. According to an embodiment, the information about the first event may imply information corresponding to the input to the first virtual object. According to an embodiment, the first identification information may imply unique identification (ID) information of the first electronic device 401 that is capable of distinguishing the first electronic device 401 from the remaining electronic devices, other than the first electronic device 401, among the multiple electronic devices connected to the server 400.

According to an embodiment, in operation 511, the first electronic device 401 may receive second identification information and information about a second event for the first virtual object. According to an embodiment, the second identification information may include identification information of any one of the multiple electronic devices connected to the server 400. According to an embodiment, the information about the second event may imply an input to the first virtual object or the end of the input to the first virtual object.

According to an embodiment, in operation 513, the first electronic device 401 may identify whether the second identification information matches the first identification information.

According to an embodiment, in operation 515, the first electronic device 401 may execute the first event when the second identification information matches the first identification information. According to an embodiment, the execution of the first event may imply that the first virtual object is selected based on the input to the first virtual object.

According to an embodiment, when the second identification information does not match the first identification information, the first electronic device 401 may identify that a second electronic device 402 (e.g., the second electronic device 402 in FIG. 4B) of the multiple electronic devices connected to the server 400 has requested an input to the first virtual object before the first electronic device 401. According to an embodiment, the second identification information may refer to identification information of the second electronic device 402. According to an embodiment, the second identification information may imply unique identification (ID) information of the second electronic device 402 that is capable of distinguishing the second electronic device 402 from the remaining electronic devices, other than the second electronic device 402, among the multiple electronic devices connected to the server 400.

According to an embodiment, when it is identified that the second electronic device 402 requested an input to the first virtual object before the first electronic device 401, the first electronic device 401 may identify, based on the information about the second event, whether the input to the first virtual object by the second electronic device 402 has ended.

According to an embodiment, the information about the second event may imply the end of the input to the first virtual object. According to an embodiment, the information about the second event may imply that the second event for the first virtual object is executed based on the end of the input to the first virtual object.

According to an embodiment, the first electronic device 401 may display the first virtual object in an inactive state through the display 414 when it is identified that the input to the first virtual object by the second electronic device 402 has not ended. According to an embodiment, the first electronic device 401 may ignore the input to the first virtual object when the first virtual object is in an inactive state.

According to an embodiment, when the second event information indicating that the input to the first virtual object by the second electronic device 402 has ended is received from the server 400, the first electronic device 401 may identify that the input to the first virtual object by the second electronic device 402 has ended. According to an embodiment, when it is identified that the input to the first virtual object by the second electronic device 402 has ended, the first electronic device 401 may display the first virtual object in an active state through the display 414. According to an embodiment, the first electronic device 401 may adjust reference brightness, reference shade, reference color, and/or reference transparency depending on whether the first virtual object is in an active state and may display the first virtual object through the display 414. For example, the first electronic device 401 may reflect the reference brightness, the reference shade, the reference color, and/or the reference transparency to the first virtual object to display the first virtual object in an active state. The first electronic device 401 may adjust the reference brightness, the reference shade, the reference color, and/or the reference transparency to display the first virtual object in an inactive state. According to an embodiment, the operation in which the first electronic device 401 identifies whether the input to the first virtual object by the second electronic device 402 ended and displays the first virtual object in an inactive state or an active state will be described in detail with reference to FIG. 6A.

Furthermore, according to an embodiment, the server 400 may store the identification information in a memory 420 (e.g., the memory 420 in FIG. 4A) in the chronological order in which the identification information is received, based on the input to the first virtual object from the multiple electronic devices connected to the server 400. For example, the memory 420 may be implemented as a queue. According to an embodiment, when it is identified that the second electronic device 402 among the multiple electronic devices connected to the server 400 has requested an input to the first virtual object before the first electronic device 401, the first electronic device 401 may display the first virtual object in a waiting state through the display 414 to indicate the waiting for execution of the first event. According to an embodiment, the first electronic device 401 may display the first virtual object in an active state through the display 414 when the end of the input to the first virtual object by the second electronic device 402 is identified. For example, the server 400 may receive the identification information of the second electronic device 402 at a first time point, may receive the identification information of the first electronic device 401 at a second time point after the first time point, and may receive identification information of a third electronic device 403 (e.g., the third electronic device 403 in FIG. 4A) at a third time point after the second time point. The first electronic device 401 and the third electronic device 403 may display the first virtual object in a waiting state. At this time, the first electronic device 401 and the third electronic device 403 may display second identification information of the second electronic device 402 around the first virtual object. When the end of the input to the first virtual object by the second electronic device 402 is identified, the first electronic device 401 may display the first virtual object in an active state through the display 414. The third electronic device 403 may display the first virtual object in a waiting state through the display 414 until the end of the input to the first virtual object by the first electronic device 401 is identified. At this time, the third electronic device 403 may display, in the waiting state, the first identification information of the first electronic device 401 around the first virtual object. According to an embodiment, the operation of the first electronic device 401 displaying the first virtual object in a waiting state will be described in detail with reference to FIG. 7A.

According to an embodiment, the event for the first virtual object may be executed simultaneously by multiple electronic devices connected to the server 400. According to an embodiment, when identification information matching the first identification information of the first electronic device 401 is not identified from among first multiple pieces of identification information, the first electronic device 401 may receive, from the server 400, second multiple pieces of identification information of the multiple electronic devices, excluding identification information of at least one electronic device, among the multiple electronic device, in which the input to the first virtual object has ended. According to an embodiment, the first electronic device 401 may display the first virtual object in an active state through the display 414 when the number of second multiple pieces of identification information is less than a predetermined number. According to an embodiment, the first electronic device 401 may display the first virtual object in an inactive state through the display 414 when the number of second multiple pieces of identification information is greater than the predetermined number. For example, the predetermined number may refer to the number of electronic devices that may simultaneously execute the event for the first virtual object. According to an embodiment, the operation of simultaneously executing the event for the first virtual object by the multiple electronic devices connected to the server 400 will be described in detail with reference to FIG. 8A.

According to an embodiment, the above-described operations performed by the second electronic device 402 and the third electronic device 403 may be performed by the first electronic device 401. However, the description of the first electronic device 401 performing the above-described operations of the second electronic device 402 and the third electronic device 403 is redundant and thus will be omitted.

The first electronic device 401, the second electronic device 402, and the third electronic device 403 may perform the above-described operations of the server 400. However, the description of the first electronic device 401, the second electronic device 402, and the third electronic device 403 performing the above-described operations of the server 400 is redundant, and thus will be omitted.

Figure 6A:
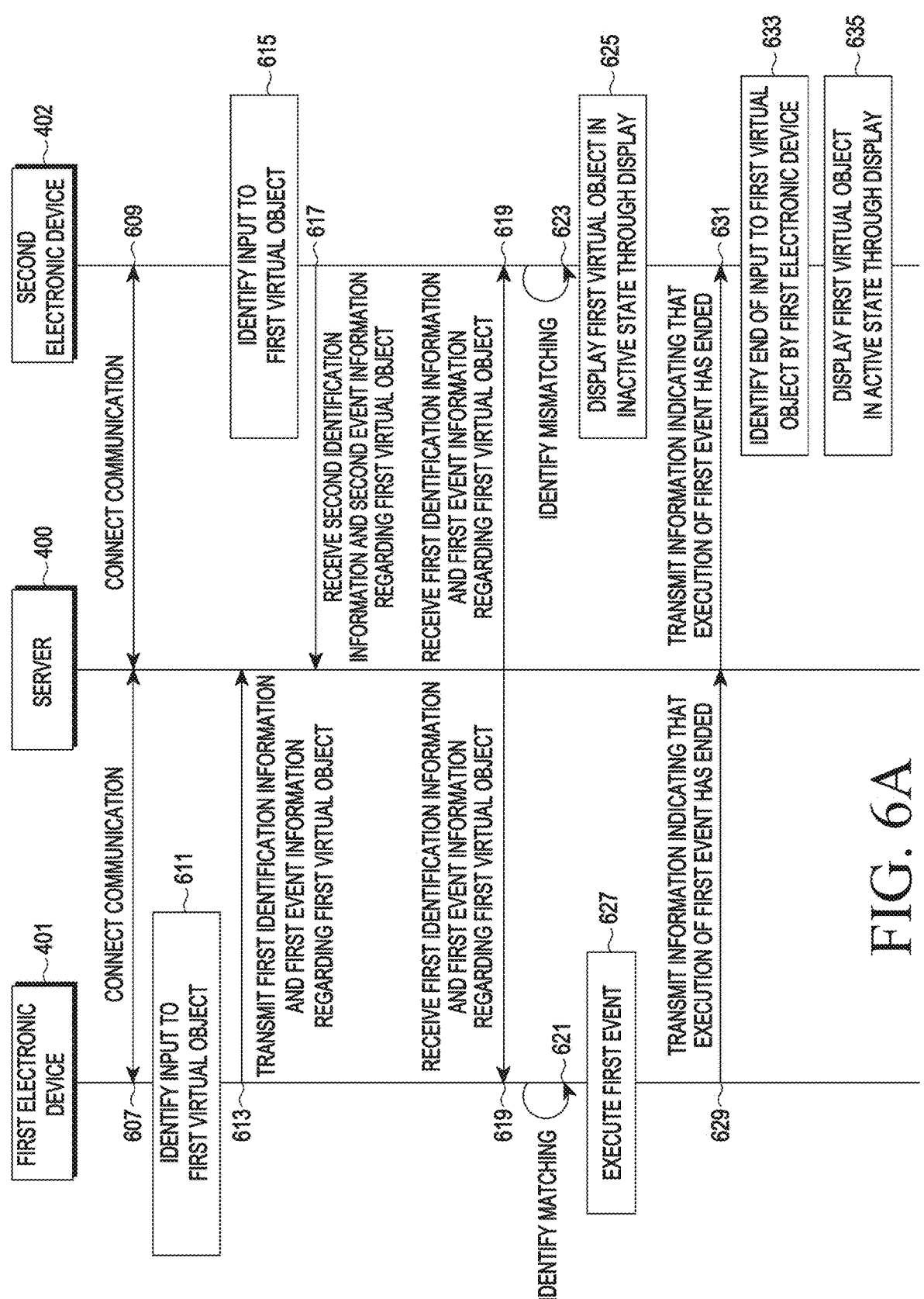
FIG. 6A is a flowchart illustrating operations of a first electronic device, a server, and a second electronic device according to an embodiment of the disclosure.

FIG. 6A is a flowchart illustrating operations of a first electronic device, a server, and a second electronic device according to an embodiment of the disclosure.

The embodiment illustrated in FIG. 6A describes a case where only one of multiple electronic devices connected to a server 400 (e.g., the server 400 in FIG. 4B) is capable of executing an event for a first virtual object at a particular time.

According to an embodiment, in operation 607, a first electronic device 401 (e.g., the first electronic device 401 in FIG. 4A) may be communicatively connected to the server 400 (e.g., the server 400 in FIG. 4B) through a communication device 417 (e.g., the communication device 417 in FIG. 4A). According to an embodiment, in operation 609, a second electronic device 402 (e.g., the second electronic device 402 in FIG. 4B) may be communicatively connected to the server 400 through the communication device.

According to an embodiment, in operation 611, the first electronic device 401 may identify an input to a first virtual object. According to an embodiment, the first electronic device 401 may identify, based on the input to the first virtual object, whether the first virtual object is in an active state. According to an embodiment, the first electronic device 401 may identify that the first virtual object is in an active state, based on not receiving second event information corresponding to an input to the first virtual object by the second electronic device 402.

According to an embodiment, in operation 613, the first electronic device 401 may transmit first identification information and first event information regarding the first virtual object to the server 400, based on the first virtual object being in an active state. For example, first event information regarding the first virtual object may refer to information corresponding to the input to the first virtual object by the first electronic device 401.

According to an embodiment, in operation 615, the second electronic device 402 may identify an input to a first virtual object. According to an embodiment, the second electronic device 402 may identify, based on the input to the first virtual object, whether the first virtual object is in an active state. According to an embodiment, the second electronic device 402 may identify that the first virtual object is in an active state, based on not receiving the first event information corresponding to the input to the first virtual object by the first electronic device 401 connected to the server 400.

According to an embodiment, in operation 617, the second electronic device 402 may transmit, based on the first virtual object being in an active state, second identification information and second event information regarding the first virtual object to the server 400. According to an embodiment, the second identification information may imply identification information that is different from the first identification information. For example, the second event information regarding the first virtual object may imply information corresponding to the input to the first virtual object by the second electronic device 402.

According to an embodiment, in operation 619, the first electronic device 401 and the second electronic device 402 may receive the first identification information and the first event information regarding the first virtual object from the server 400. According to an embodiment, the server 400 may transmit first event information and first identification information, which have been received first, to the first electronic device 401 and the second electronic device 402.

According to an embodiment, in operation 621, the first electronic device 401 may identify that the identification information of the first electronic device 401 transmitted to the server 400 matches the identification information received from the server 400. According to an embodiment, when the identification information received from the server 400 matches the identification information transmitted to the server 400, it may be identified that the first electronic device 401 requested the input to the first virtual object before the second electronic device 402 connected to the server 400.

According to an embodiment, in operation 623, the second electronic device 402 may identify that the identification information of the second electronic device 402 transmitted to the server 400 does not match the first identification information received from the server 400. According to an embodiment, when the second identification information does not match the first identification information, the second electronic device 402 may identify that the first electronic device 401 requested the input to the first virtual object before the second electronic device 402.

According to an embodiment, in operation 625, the second electronic device 402 may display the first virtual object in an inactive state through a display. According to an embodiment, the second electronic device 402 may not execute a second event based on identifying that the first electronic device 401 requested the input to the first virtual object before the second electronic device 402. According to an embodiment, the inactive state may include a case where the input to the first virtual object is ignored and no event is executed. According to an embodiment, the second electronic device 402 may adjust reference brightness, reference shade, reference color, and/or reference transparency, which has been predetermined, to display the first virtual object in an inactive state. According to an embodiment, the execution of the second event may imply that the first virtual object is selected based on the input of the second electronic device 402 to the first virtual object.

According to an embodiment, in operation 627, the first electronic device 401 may execute a first event, based on matching of the first identification information and the identification information received from the server 400. According to an embodiment, the execution of the first event may imply that the first virtual object is selected based on the input of the first electronic device 401 to the first virtual object.

According to an embodiment, in operation 629, the first electronic device 401 may transmit, to the server 400, information indicating that the execution of the first event has ended. According to an embodiment, the information indicating that the execution of the first event has ended may imply information indicating that the input of the first electronic device 401 to the first object has ended and the first virtual object has been selected.

According to an embodiment, in operation 631, the server 400 may transmit, to the second electronic device 402, the information indicating that the execution of the first event by the first electronic device 401 has ended.

According to an embodiment, in operation 633, the second electronic device 402 may identify the end of the input to the first virtual object by the first electronic device 401, based on receiving, from the server 400, the information indicating that the execution of the first event by the first electronic device 401 has ended.

According to an embodiment, in operation 635, the second electronic device 402 may display the first virtual object in an active state through the display, based on identifying the end of the input to the first virtual object by the first electronic device 401. According to an embodiment, the second electronic device 402 may display the first virtual object in an active state with reference brightness, reference shade, reference color, and/or reference transparency, which has been predetermined. According to an embodiment, when a reinput to the first virtual object is identified, the second electronic device 402 may execute an event corresponding to the reinput. In doing so, the first electronic device 401 may notify a user of whether the reinput for the execution of an event for the first virtual object is valid.

According to an embodiment, the above-described operations performed on the second electronic device 402 may also be performed by the first electronic device 401. However, a description of the first electronic device 401 performing the above-described operations of the second electronic device 402 is redundant and will be omitted.

The first electronic device 401 and the second electronic device 402 may perform the above-described operations of the server 400. However, a description of the first electronic device 401 and the second electronic device 402 performing the above-described operations of the server 400 is redundant and will be omitted.

Figure 6B:
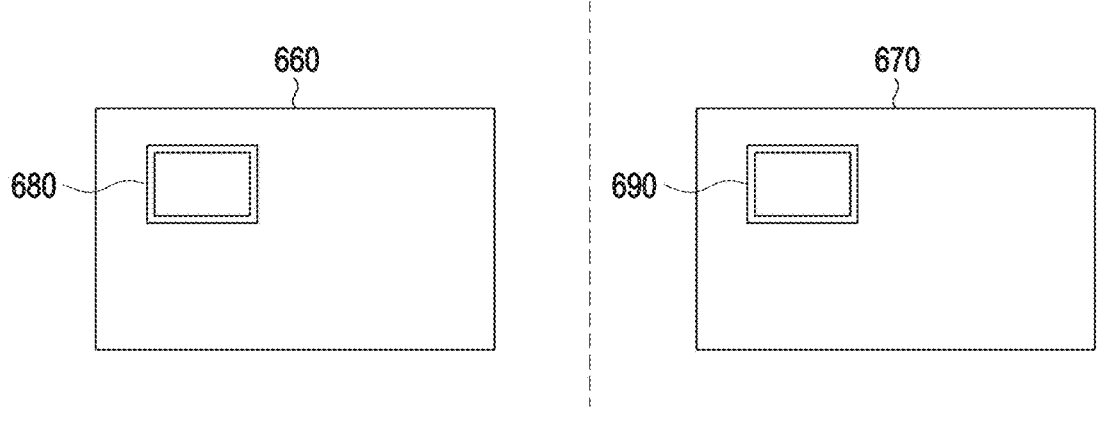
FIG. 6B is a view in which a first electronic device and a second electronic device display a first virtual object in an active state through a display according to an embodiment of the disclosure.

FIG. 6B is a view in which a first electronic device and a second electronic device display a first virtual object in an active state through a display according to an embodiment of the disclosure.

Referring to FIG. 6B, a first electronic device 401 (e.g., the first electronic device 401 in FIG. 4B) may display a screen 660 through a display 414 (e.g., the display 414 in FIG. 4A), and a second electronic device 402 (e.g., the second electronic device 402 in FIG. 4B) may display a screen 670 through a display included in the second electronic device 402.

According to an embodiment, the first electronic device 401 and the second electronic device 402 may be communicatively connected to a server 400 (e.g., the server 400 in FIG. 4B).

According to an embodiment, the first electronic device 401 may display a first virtual object 680 in an active state through the display 414, based on the fact that an input to the first virtual object by the second electronic device 402 connected to the server 400 is not identified.

According to an embodiment, the second electronic device 402 may display a first virtual object 690 in an active state through the display, based on the fact that an input to the first virtual object by the first electronic device 401 connected to the server 400 is not identified.

For example, the first electronic device 401 and the second electronic device 402 may display the first virtual object 680 and 690 in an active state with reference brightness, reference shade, reference color, and/or reference transparency, which has been predetermined.

Figure 6C:
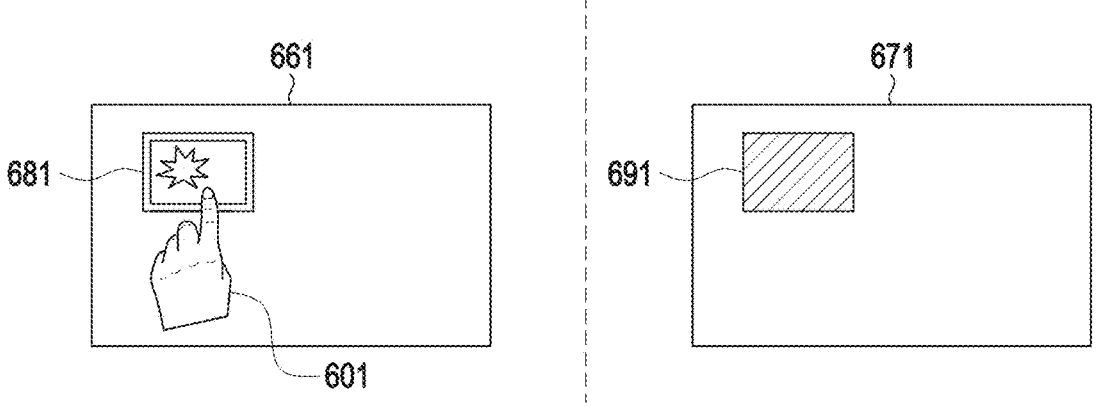
FIG. 6C illustrates a screen on which a first electronic device displays a first virtual object in an event-running state through a display, and a screen on which a second electronic device displays a virtual object in an inactive state through a display according to an embodiment of the disclosure.

FIG. 6C illustrates a screen 661 on which a first electronic device displays a first virtual object in an event-running state through a display, and a screen 671 on which a second electronic device displays a virtual object in an inactive state through a display according to an embodiment of the disclosure.

Referring to FIG. 6C, according to an embodiment, a first electronic device 401 (e.g., the first electronic device 401 in FIG. 4B) may display a virtual pointer 601 through a display 414 (e.g., the display 414 in FIG. 4A). The virtual pointer 601 may move in response to movement of a user's body (e.g., the hand or the finger).

According to an embodiment, the first electronic device 401 may identify an input (e.g., touch) for a first virtual object by the virtual pointer 601. According to an embodiment, the first electronic device 401 may identify, based on the input to the first virtual object, whether the first virtual object is in an active state. According to an embodiment, when it is identified that the first virtual object is in an active state, the first electronic device 401 may transmit, to a server 400, first identification information of the first electronic device 401 and first event information corresponding to the input to the first virtual object. According to an embodiment, the server 400 may transmit first identification information and first event information corresponding to the input to the first virtual object, which have been received first, to the first electronic device 401 and the second electronic device 402.

According to an embodiment, the first electronic device 401 may identify whether the identification information received from the server 400 matches the identification information of the first electronic device 401. According to an embodiment, the first electronic device 401 may execute a first event based on the matching between the first identification information received from the server 400 and the identification information of the first electronic device 401. For example, the execution of the first event may imply that the first virtual object has been selected. According to an embodiment, when the first event is executed, the first electronic device 401 may display a first virtual object 681 in an event-running state through the display 414. For example, the first electronic device 401 may adjust reference brightness, a reference shade, reference color, and/or reference transparency, which has been predetermined, to display the first virtual object 681 in an event-running state. For example, the first electronic device 401 may display a shape (e.g., an ellipse, etc.) in the first virtual object having a reference value to display the first virtual object 681 in an event-running state.

According to an embodiment, when first identification information different from second identification information of the second electronic device 402 and first event information corresponding to an input to the first virtual object are received from the server 400, the second electronic device 402 may identify that there is a request for the input to the first virtual object by the first electronic device 401. According to an embodiment, the second electronic device 402 may display a first virtual object 691 in an inactive state when it is identified that there is an input request for the first virtual object by the first electronic device 401. For example, the second electronic device 402 may adjust reference brightness, reference shade, reference color, and/or reference transparency, which has been predetermined, to display the first virtual object 691 in an inactive state.

Figure 6D:
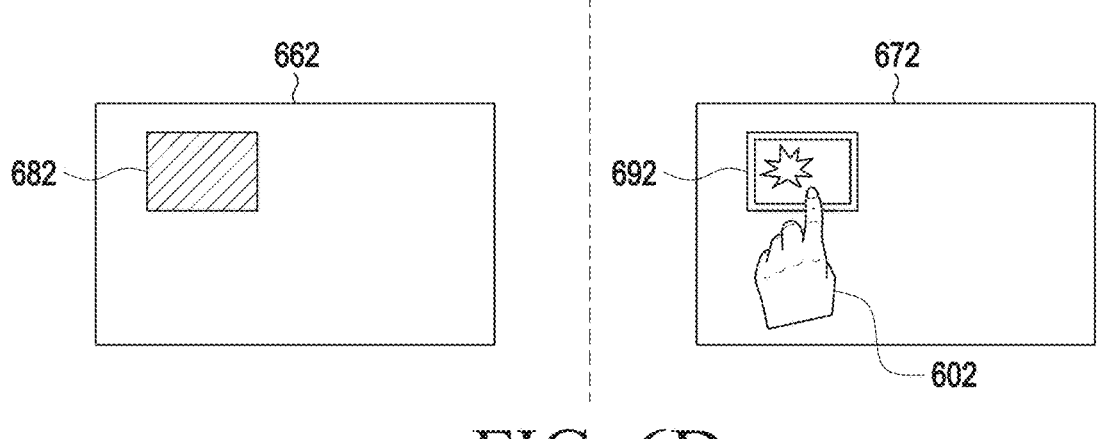
FIG. 6D illustrates a screen on which a first electronic device displays a virtual object in an inactive state through a display and a screen on which a second electronic device displays a first virtual object in an event-running state through a display according to an embodiment of the disclosure.

FIG. 6D illustrates a screen 662 on which a first electronic device displays a virtual object in an inactive state through a display and a screen 672 on which a second electronic device displays a first virtual object in an event-running state through a display according to an embodiment of the disclosure.

Referring to FIG. 6D, according to an embodiment, a second electronic device 402 (e.g., the second electronic device 402 in FIG. 4B) may display a virtual pointer 602 on a display. The virtual pointer 602 may move in response to movement of a user's body (e.g., the hand or the finger).

According to an embodiment, the second electronic device 402 may identify an input (e.g., a touch) to the first virtual object by the virtual pointer 602. According to an embodiment, the second electronic device 402 may identify, based on the input to the first virtual object, whether the first virtual object is in an active state. According to an embodiment, when it is identified that the first virtual object is in an active state, the second electronic device 402 may transmit, to a server 400, second identification information of the second electronic device 402 and second event information corresponding to the input to the first virtual object. According to an embodiment, the server 400 may transmit second event information corresponding to the input to the first virtual object and second identification information, which have been received first, to a first electronic device 401 and the second electronic device 402.

According to an embodiment, the second electronic device 402 may identify whether identification information received from the server 400 matches identification information of the second electronic device 402. According to an embodiment, the second electronic device 402 may execute a second event based on the matching between the second identification information received from the server 400 and the identification information of the second electronic device 402. For example, the execution of the second event may imply that the first virtual object is selected. According to an embodiment, when the second event is executed, the second electronic device 402 may display a first virtual object 692 in an event-running state through a display. For example, the second electronic device 402 may adjust reference brightness, reference shade, reference color, and/or reference transparency, which has been predetermined, to display the first virtual object 692 in an event-running. For example, the second electronic device 402 may display a shape (e.g., an ellipse, etc.) in the first virtual object having a reference value to display the first virtual object 692 in an event-running state.

According to an embodiment, when second identification information different from identification information of the first electronic device 401 and second event information corresponding to an input to the first virtual object are received from the server 400, the first electronic device 401 may display the first virtual object in an inactive state. For example, the first electronic device 401 may adjust reference brightness, reference shade, reference color, and/or reference transparency, which has been predetermined, to display a first virtual object 682 in an inactive state.

Figure 7A:
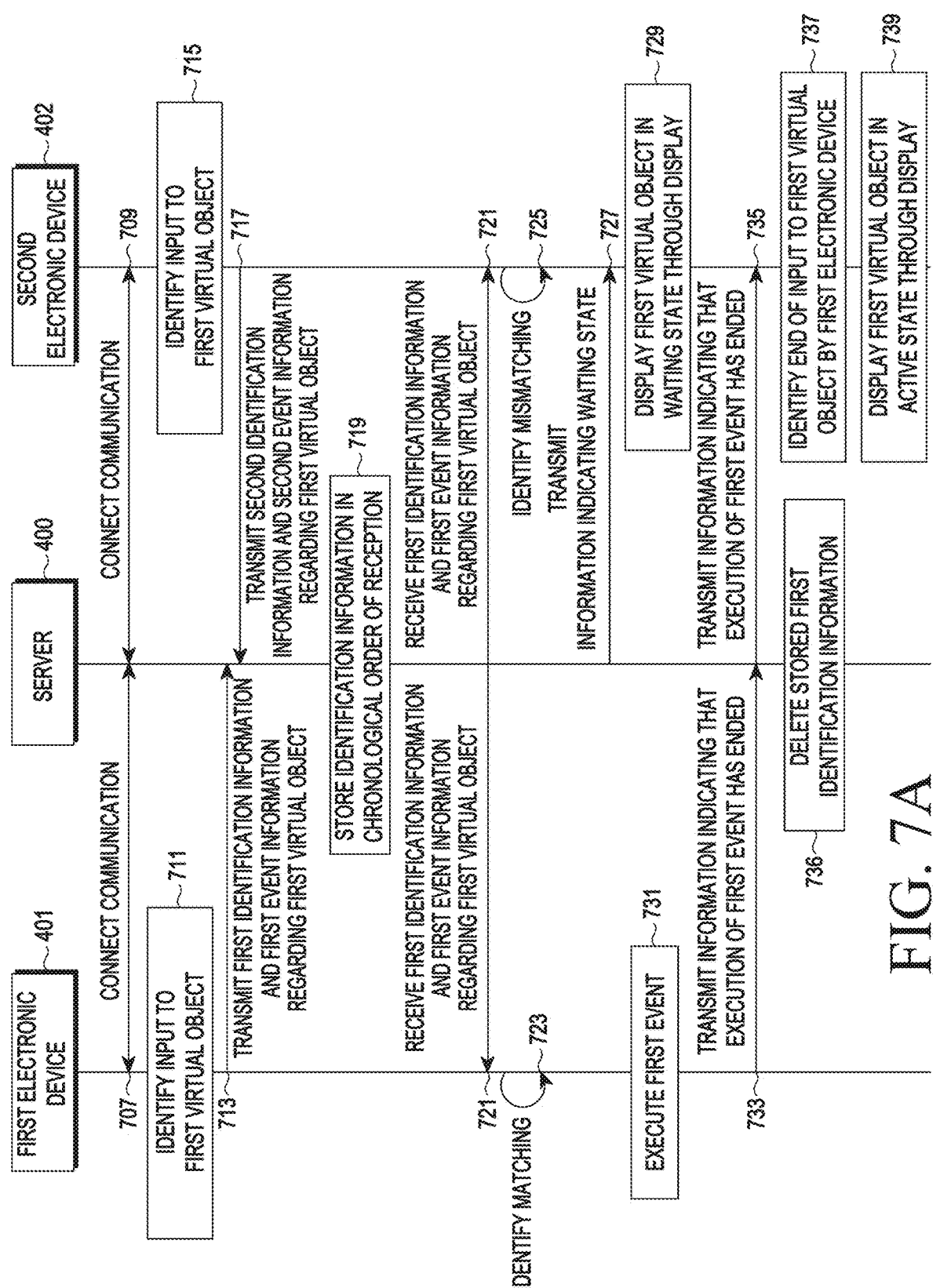
FIG. 7A is a flowchart illustrating operations of a first electronic device, a server, and a second electronic device according to an embodiment of the disclosure.

FIG. 7A is a flowchart illustrating operations of a first electronic device, a server, and a second electronic device according to an embodiment of the disclosure.

Referring to FIG. 7A, according to an embodiment, multiple electronic devices connected to a server 400 (e.g., the server 400 in FIG. 4B) may be controlled such that only one of the multiple electronic devices executes an event for a first virtual object at a particular time point.

According to an embodiment, in operation 707, a first electronic device 401 (e.g., the first electronic device 401 in FIG. 4B) may be connected to the server 400 through a communication device 417 (e.g., the communication device 417 in FIG. 4A). According to an embodiment, in operation 709, a second electronic device 402 (e.g., the second electronic device 402 in FIG. 4B) may be connected to the server 400 through the communication device.

According to an embodiment, in operation 711, the first electronic device 401 may identify an input (e.g., touch) to a first virtual object. According to an embodiment, the first electronic device 401 may determine, based on the input to the first virtual object, whether the first virtual object is in an active state. According to an embodiment, the first electronic device 401 may identify that the first virtual object is in an active state, based on not receiving second event information corresponding to the input to the first virtual object by the second electronic device 402 connected to the server 400.

According to an embodiment, in operation 713, the first electronic device 401 may transmit first identification information and first event information regarding the first virtual object to the server 400. According to an embodiment, the first electronic device 401 may transmit, based on the identification of the active state of the first virtual object, the first identification information and the first event information corresponding to the input to the first virtual object to the server 400.

According to an embodiment, in operation 715, the second electronic device 402 may identify an input (e.g., touch) to the first virtual object. According to an embodiment, the second electronic device 402 may identify, based on the input to the first virtual object, whether the first virtual object is in an active state. According to an embodiment, the second electronic device 402 may identify that the first virtual object is in an active state, based on not receiving the first event information corresponding to the input to the first virtual object by the first electronic device 401 connected to the server 400.

According to an embodiment, in operation 717, the second electronic device 402 may transmit second identification information and second event information regarding the first virtual object to the server 400. According to an embodiment, the second electronic device 402 may transmit, based on the identification of the active state of the first virtual object, the second identification information and the second event information corresponding to the input (e.g., touch) for the first virtual object to the server 400.

According to an embodiment, in operation 719, the server 400 may store the identification information in chronological order of reception thereof. According to an embodiment, the server 400 may store the pieces of identification information in a memory 420 (e.g., the memory 420 in FIG. 4A). For example, the memory 420 may be implemented as a queue. According to an embodiment, based on the first identification information being received earlier, the server 400 may store, in the queue, the first identification information received earlier and the second identification information received later. According to an embodiment, the server 400 may transmit first identification information and first event information, which have been received first, to the first electronic device 401 and the second electronic device 402.

According to an embodiment, in operation 721, the first electronic device 401 and the second electronic device 402 may receive the first identification information and the first event information regarding the first virtual object from the server 400.

According to an embodiment, in operation 723, the first electronic device 401 may compare the first identification information of the first electronic device 401 transmitted to the server 400 with the first identification information received from the server 400, and may identify a match therebetween as a result of the comparison.

According to an embodiment, in operation 725, the second electronic device 402 may compare the second identification information of the second electronic device 402 transmitted to the server 400 with the first identification information received from the server 400, and may identify a mismatch therebetween as a result of the comparison.

According to an embodiment, in operation 727, the server 400 may transmit, to the second electronic device 402, information indicating that the first virtual object is in a waiting state. According to an embodiment, when it is determined that the first electronic device 401, among the multiple electronic devices, has requested an input to the first virtual object before the second electronic device 402, the server 400 may transmit, to the second electronic device 402, the information indicating that the first virtual object is in a waiting state.

According to an embodiment, in operation 729, the second electronic device 402 may display the first virtual object in a waiting state through a display. At this time, the second electronic device 402 may display the first identification information of the first electronic device 401 around the first virtual object. For example, the server 400 may receive the first identification information of the first electronic device 401 at a first time point, may receive the second identification information of the second electronic device 402 at a second time point after the first time point, and may receive third identification information of a third electronic device 403 (e.g., the third electronic device 403 in FIG. 4B) at a third time point after the second time point. The server 400 may store the identification information in the memory 420 based on the order in which the identification information is received. For example, the memory 420 may be implemented as a queue. The second electronic device 420 and the third electronic device 403 each may display the first virtual object as a waiting state. The second electronic device 401 and the third electronic device 403 each may display the first identification information of the first electronic device 401 around the first virtual object. The second electronic device 402 may display the first virtual object as in an active state through the display when the end of the input to the first virtual object by the first electronic device 401 is identified. The third electronic device 403 may display the first virtual object in a waiting state through a display until the end of the input to the first virtual object by the second electronic device 402 is identified. In the standby state, the third electronic device 403 may display the second identification information of the second electronic device 402 around the first virtual object.

According to an embodiment, in operation 731, the first electronic device 401 may execute a first event. According to an embodiment, the execution of the first event may imply that the first virtual object is selected.

According to an embodiment, in operation 733, the first electronic device 401 may transmit, to the server 400, information indicating that the execution of the first event has ended.

According to an embodiment, in operation 735, the server 400 may transmit, to the second electronic device 402, the information indicating that the execution of the first event has ended.

According to an embodiment, in operation 736, the server 400 may delete the first identification information stored in the memory 420. According to an embodiment, the server 400 may delete the first identification information stored in the memory 420, based on receiving the information indicating that the execution of the first event has ended. While FIG. 7 describes operation 736 as being performed after operation 735, according to another embodiment of the disclosure operation 735 and operation 736 may be performed simultaneously.

According to an embodiment, in operation 737, the second electronic device 402 may identify that the end of the input to the first virtual object by the first electronic device 401 (or the end of the execution of the first event), based on the information indicating that the execution of the first event has ended.

According to an embodiment, in operation 739, the second electronic device 402 may display the first virtual object in an active state through the display based on the end of input to the first virtual object by the first electronic device 401. According to an embodiment, when a reinput to the first virtual object is identified, the second electronic device 402 may transmit, to the server 400, the second identification information and event information corresponding to the reinput to the first virtual object. According to an embodiment, the server 400 may transmit the second identification information stored in the memory 420 to the second electronic device 402. According to an embodiment, the second electronic device 402 may execute a second event.

According to an embodiment, the above-described operations performed by the second electronic device 402 may also be performed by the first electronic device 401. However, a description of the first electronic device 401 performing the above-described operations of the second electronic device 402 is redundant and will be omitted.

The first electronic device 401 and the second electronic device 402 may perform the above-described operations of the server 400. However, a description of the first electronic device 401 and the second electronic device 402 performing the above-described operations of the server 400 is redundant and will be omitted.

Figure 7B:
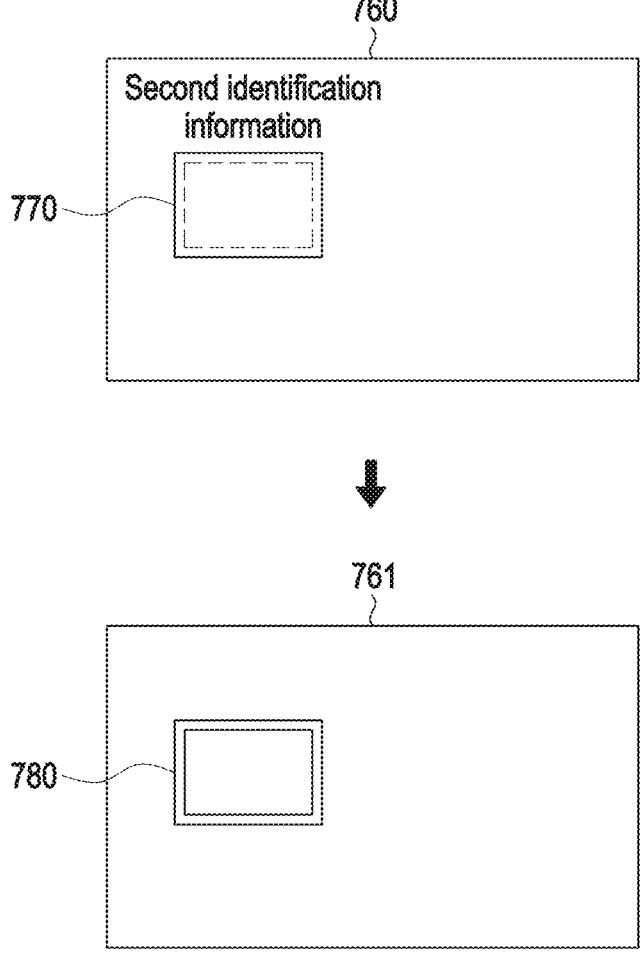
FIG. 7B is a view in which a first electronic device displays a first virtual object in a waiting state through a display according to an embodiment of the disclosure.

FIG. 7B is a view in which a first electronic device displays a first virtual object in a waiting state through a display according to an embodiment of the disclosure.

Referring to FIG. 7B, a first electronic device 401 (e.g., the first electronic device 401 in FIG. 4B) may display a screen 760 or 761 through a display 414 (e.g., the display 414 in FIG. 4B).

According to an embodiment, a second electronic device 402 (e.g., the second electronic device 402 in FIG. 4B) may display a first virtual object in an active state when it is identified that the first virtual object is in an active state. The second electronic device 402 may identify an input to the first virtual object by a user of the second electronic device 402. Based on the input to the first virtual object, the second electronic device 402 may transmit event information about the first virtual object (e.g., a touch input to the first virtual object) and second identification information of the second electronic device 402 to a server 400 (e.g., the server 400 in FIG. 4B).

According to an embodiment, after the second electronic device 402 transmits second event information and the second identification information to the server 400, the first electronic device 401 (e.g., the first electronic device 401 in FIG. 4B) may display the first virtual object in an active state when the first virtual object is determined to be in the active state. The first electronic device 401 may identify an input to the first virtual object by a user of the first electronic device 401. Based on the input to the first virtual object, the first electronic device 401 may transmit event information about the first virtual object (e.g., a touch input to the first virtual object) and first identification information of the first electronic device 401 to the server 400.

According to an embodiment, the server 400 may store the second identification information received at a first time point and the first identification information received at a second time point after the first time point in a memory 420 (e.g., the memory 420 in FIG. 4A) in chronological order. For example, the memory 420 may be implemented as a queue. According to an embodiment, the server 400 may transmit second identification information and second event information, which have been received first, to the first electronic device 401 and the second electronic device 402.

According to an embodiment, the first electronic device 401 may receive, from the server 400, the second identification information that is different from the first identification information. The first electronic device 401 may receive, from the server 400, information indicating that the first virtual object is in a waiting state.

According to an embodiment, the first electronic device 401 may display a first virtual object 770 in a waiting state. For example, the first electronic device 401 may display the second identification information around the first virtual object. However, this is an example, and in embodiments of the disclosure, the first virtual object in an active state and the first virtual object in a waiting state may be displayed to be distinguished from each other in various ways. In doing so, the first electronic device 401 may notify of the fact that another electronic device (e.g., the second electronic device 402), among multiple electronic devices connected to the server 400, is executing an event for the first virtual object before the first electronic device 401. The first electronic device 401 may notify the user to wait for the execution of the event for the first virtual object. Furthermore, the first electronic device 401 may visually provide the user with information about the timing of a reinput to the first virtual object.

According to an embodiment, the first electronic device 401 may receive, from the server 400, information indicating that an event (e.g., touch input) for the first virtual object by the second electronic device 402 has ended. The first electronic device 401 may display a first virtual object 780 in an active state, based on the end of the event for the first virtual object by the second electronic device 402.

Figure 8A:
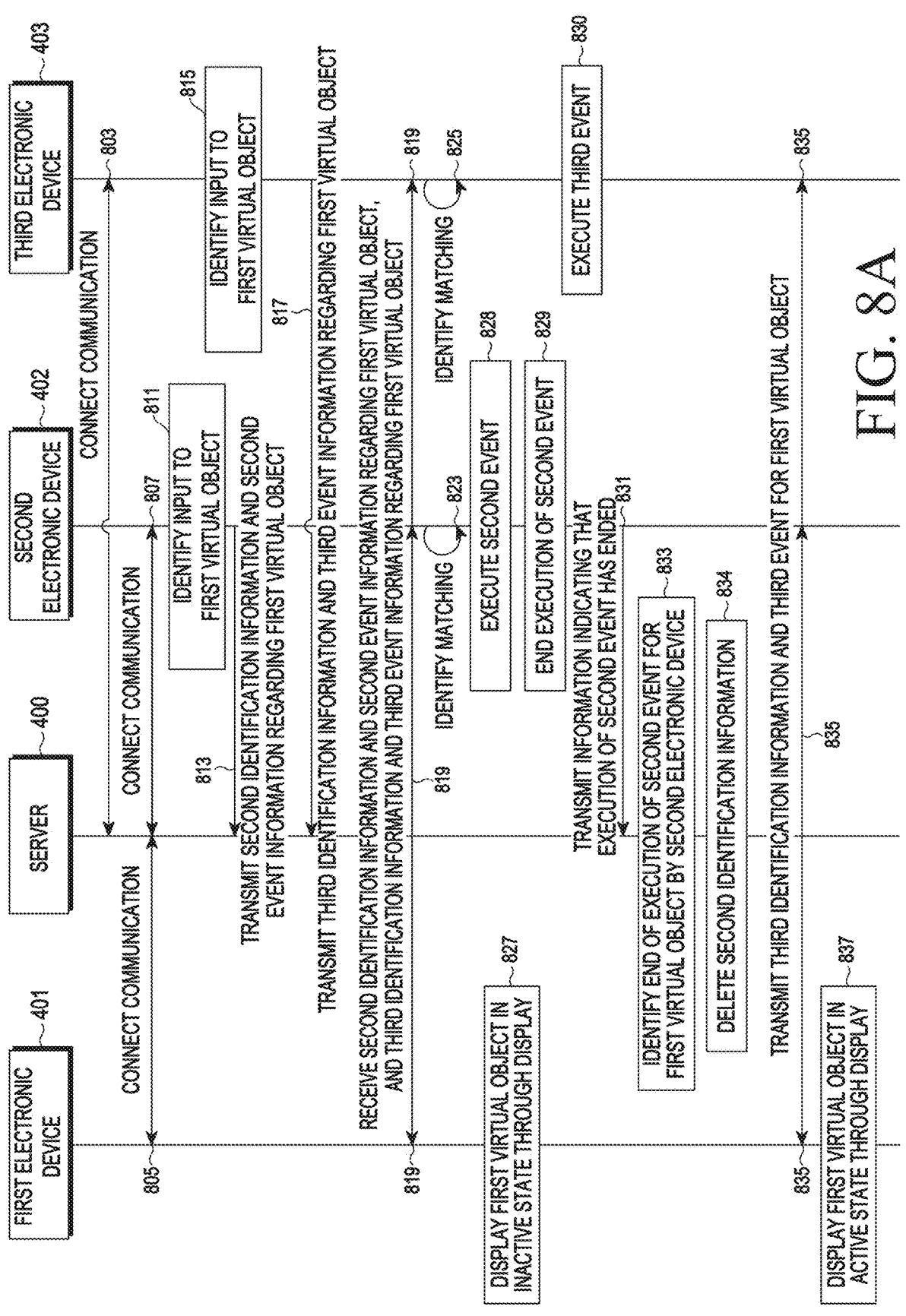
FIG. 8A is a flowchart illustrating operations of a first electronic device, a server, a second electronic device, and a third electronic device according to an embodiment of the disclosure.

FIG. 8A is a flowchart illustrating operations of a first electronic device, a server, a second electronic device, and a third electronic device according to an embodiment of the disclosure.

Referring to FIG. 8A, according to an embodiment, multiple electronic devices connected to a server 400 (e.g., the server 400 in FIG. 4B) may be controlled such that a predetermined number of electronic devices, among the multiple electronic devices, may simultaneously execute an event for the first virtual object at a particular time point. For example, a predetermined number of electronic devices of the multiple electronic devices may execute an event related to a writing action by using virtual pointers displayed through respective displays thereof. For example, the execution of the event for the first virtual object may include writing using the virtual pointers. For example, when each of a predetermined number of electronic devices among multiple electronic devices executes an event related to a writing action by using a virtual pointer, the writing may be shared by displays of the predetermined number of electronic devices of the multiple electronic devices connected to the server 400.

According to an embodiment, in operation 803, a third electronic device 403 (e.g., the third electronic device 403 in FIG. 4A) may be communicatively connected to the server 400 (e.g., the server 400 in FIG. 4A) through a communication device. According to an embodiment, in operation 805, a first electronic device 401 (e.g., the first electronic device 401 in FIG. 4A) may be communicatively connected to the server 400 through the communication device 417 (e.g., the communication device 417 in FIG. 4A). According to an embodiment, in operation 807, a second electronic device 402 (e.g., the second electronic device 402 in FIG. 4A) may be communicatively connected to the server 400 through a communication device.

According to an embodiment, in operation 811, the second electronic device 402 may identify an input (e.g., touch) to a first virtual object. According to an embodiment, the second electronic device 402 may identify, based on the input to the first virtual object, whether the first virtual object is in an active state. According to an embodiment, the second electronic device 402 may identify that the first virtual object is in an active state, based on not receiving event information corresponding to an input to the first virtual object by other electronic devices connected to the server 400.

According to an embodiment, in operation 813, the second electronic device 402 may transmit second identification information and second event information regarding the first virtual object to the server 400 based on identifying that the first virtual object is in an active state. For example, the second event information may refer to information corresponding to an input to the first virtual object.

According to an embodiment, in operation 815, the third electronic device 403 may identify an input (e.g., touch) to a first virtual object. According to an embodiment, the third electronic device 403 may identify, based on the input to the first virtual object, whether the first virtual object is in an active state. According to an embodiment, the third electronic device 403 may identify that the first virtual object is in an active state, based on not receiving event information corresponding to inputs to the first virtual object by other electronic devices connected to the server 400.

According to an embodiment, in operation 817, the third electronic device 403 may transmit third identification information and third event information regarding the first virtual object to the server 400 based on identifying that the first virtual object is in an active state. For example, the third event information may refer to information corresponding to an input to the first virtual object.

According to an embodiment, in operation 819, the first electronic device 401, the second electronic device 402, and the third electronic device 403 may receive, from the server 400, the second identification information and the second event information regarding the first virtual object and the third identification information and the third event information regarding the first virtual object. According to an embodiment, the server 400 may identify whether the number of received multiple pieces of identification information is less than or equal to a predetermined number (e.g., two). According to an embodiment, the predetermined number may refer to the number of electronic devices capable of simultaneously executing an event for the first virtual object. According to an embodiment, when it is determined that the number of received first multiple pieces of identification information is less than or equal to the predetermined number, the server 400 may transmit all of the received first multiple pieces of identification information to multiple electronic devices connected to the server 400. According to an embodiment, when the number of received first multiple pieces of identification information exceeds the predetermined number, the server 400 may transmit second multiple pieces of identification information, excluding identification information (or pieces of identification information) of an electronic device (or electronic devices) corresponding to the exceeded number, to multiple electronic devices currently connected to the server 400. For example, the server 400 may transmit the second identification information and the second event information and the third identification information and the third event information to the first electronic device 401, the second electronic device 402, and the third electronic device 403, based on the number of the received multiple pieces of identification information (e.g., the second identification information and the third identification information) (e.g., two) being less than or equal to the predetermined number (e.g., two).

According to an embodiment, in operation 823, the second electronic device 402 may identify that the multiple pieces of identification information received from the server 400 includes identification information that matches the second identification information.

According to an embodiment, in operation 825, the third electronic device 403 may identify that the multiple pieces of identification information received from the server 400 includes identification information that matches the third identification information.

According to an embodiment, in operation 827, the first electronic device 401 may display the first virtual object in an inactive state through the display 414. According to an embodiment, the first electronic device 401 may receive, from the server 400, information indicating that the number of pieces of identification information for which an event of the first virtual object is currently running is not less than a predetermined number. For example, the predetermined number may refer to the number of electronic devices capable of simultaneously executing an event for the first virtual object. According to an embodiment, the first electronic device 401 may identify, based on the above information, whether the number of received pieces of identification information is less than the predetermined number. According to an embodiment, the first electronic device 401 may display the first virtual object in an inactive state, based on identifying that the number of received pieces of identification information (e.g., two) is not less than the predetermined number (e.g., two). Alternatively, the first electronic device 401 may directly determine, based on the pieces of identification information received from the server 400, whether the number of received pieces of identification information is less than the predetermined number.

According to an embodiment, in operation 828, the second electronic device 402 may execute a second event for the first virtual object. According to an embodiment, the second electronic device 402 may execute the second event based on identifying identification information matching the second identification information from among the received multiple pieces of identification information. For example, when the second event is executed, the second electronic device 402 may perform an event related to a writing action using a virtual pointer displayed through the display.

According to an embodiment, in operation 829, the second electronic device 402 may end the execution of the second event for the first virtual object. For example, the end of the execution of the second event may imply ending the event related to the writing action using the virtual pointer.

According to an embodiment, in operation 830, the third electronic device 403 may execute a third event for the first virtual object. According to an embodiment, the third electronic device 403 may execute the third event based on identifying identification information matching the third identification information from among the received multiple pieces of identification information. For example, when the third event is executed, the third electronic device 403 may perform an event related to a writing action using a virtual pointer displayed through the display.

According to an embodiment, in operation 831, the second electronic device 402 may transmit, to the server 400, information indicating that the execution of the second event has ended.

According to an embodiment, in operation 833, the server 400 may identify the end of the execution of the second event for the first virtual object by the second electronic device 402.

According to an embodiment, in operation 834, the server 400 may delete, from a memory 420 (e.g., the memory 420 in FIG. 4A), the second event information and the second identification information of the second electronic device 402 that has ended the execution of the event for the first virtual object.

According to an embodiment, in operation 835, the server 400 may transmit the third identification information and the third event for the first virtual object to the first electronic device 401, the second electronic device 402, and the third electronic device 403.

According to an embodiment, in operation 837, the first electronic device 401 may display the first virtual object in an active state through the display 414 based on identifying that the number of pieces of identification information received from the server 400 is less than the predetermined number (e.g., two). For example, the first electronic device 401 may receive, from the server 400, information indicating that the number of pieces of identification information for which an event of the first virtual object is currently being executed is less than the predetermined number.

According to an embodiment, the first electronic device 401 may display the first virtual object in an inactive state through the display 414 based on identifying that the number of pieces of identification information received from the server 400 is greater than the predetermined number. For example, the first electronic device 401 may receive, from the server 400, information indicating that the number of pieces of identification information for which an event of the first virtual object is currently being executed is greater than the predetermined number.

The first electronic device 401, the second electronic device 402, and the third electronic device 403 may perform the above-described operations of the server 400. However, a description of the first electronic device 401, the second electronic device 402, and the third electronic device 403 performing the above-described operations of the server 400 is redundant and will be omitted.

Figure 8B:
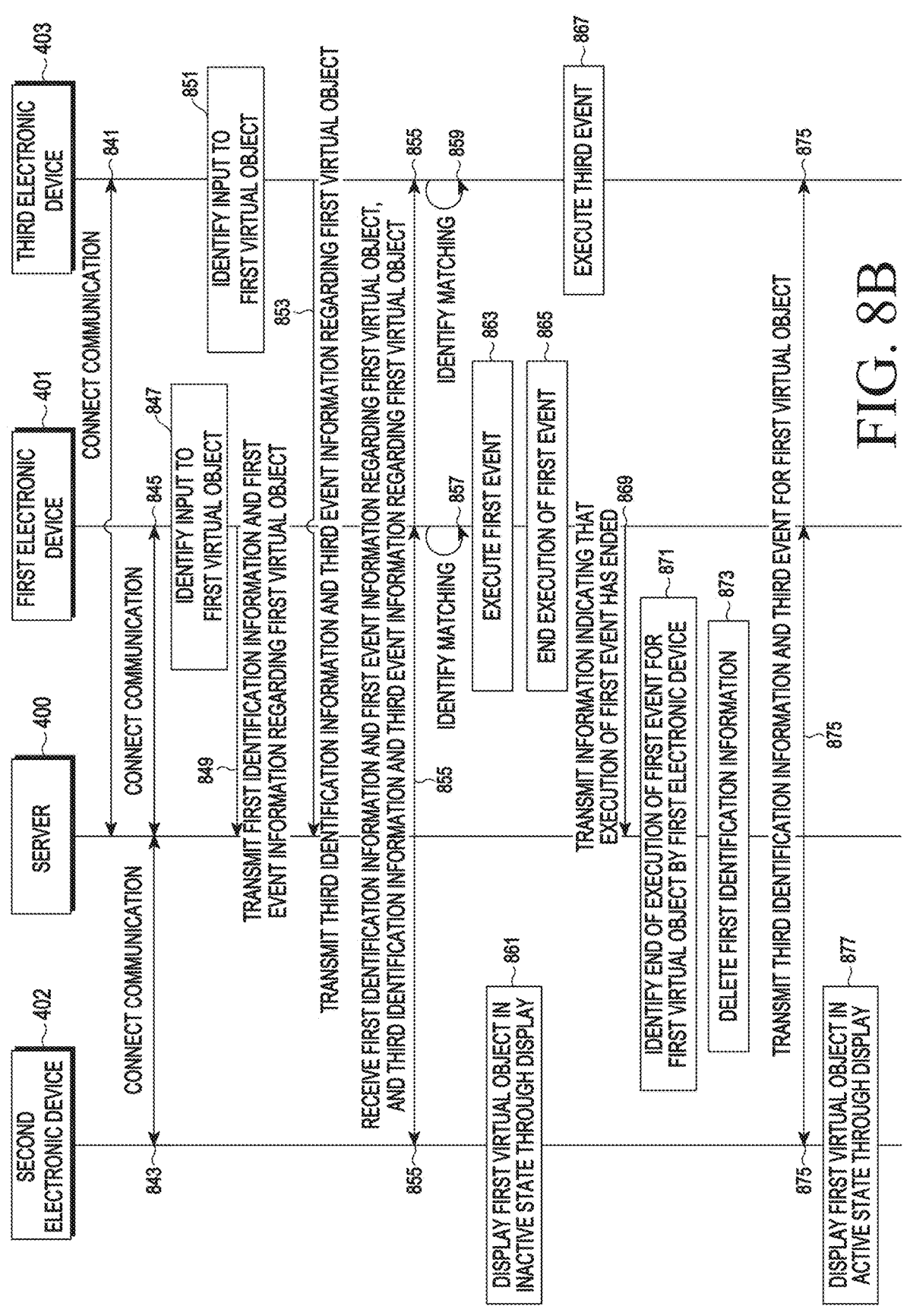
FIG. 8B is a flowchart illustrating operations of a first electronic device, a server, a second electronic device, and a third electronic device according to an embodiment of the disclosure.

FIG. 8B is a flowchart illustrating operations of a first electronic device, a server, a second electronic device, and a third electronic device according to an embodiment of the disclosure.

Referring to FIG. 8B, a predetermined number of electronic devices among multiple electronic devices connected to a server 400 (e.g., the server 400 in FIG. 4B) may execute an event for a first virtual object at a particular time point.

According to an embodiment, in operation 841, a third electronic device 403 (e.g., the third electronic device 403 in FIG. 4A) may be connected to a server 400 (e.g., the server 400 in FIG. 4A) through a communication device. According to an embodiment, in operation 843, a second electronic device 402 (e.g., the second electronic device 402 in FIG. 4A) may be connected to the server 400 through a communication device. According to an embodiment, in operation 845, a first electronic device 401 (e.g., the first electronic device 401 in FIG. 4A) may be connected to the server 400 through a communication device 417 (e.g., the communication device 417 in FIG. 4A).

According to an embodiment, in operation 847, the first electronic device 401 may identify an input (e.g., a touch) to a first virtual object. According to an embodiment, the first electronic device 401 may identify, based on the input to the first virtual object, whether the first virtual object is in an active state. According to an embodiment, the first electronic device 401 may identify that the first virtual object is in an active state, based on not receiving event information corresponding to inputs to the first virtual object by other electronic devices connected to the server 400.

According to an embodiment, in operation 849, the first electronic device 401 may transmit first identification information and first event information regarding the first virtual object to the server 400, based on identifying that the first virtual object is in an active state.

According to an embodiment, in operation 851, the third electronic device 403 may identify an input to a first virtual object.

According to an embodiment, in operation 853, the third electronic device 403 may transmit third identification information and third event information regarding the first virtual object to the server 400.

According to an embodiment, in operation 855, the first electronic device 401, the second electronic device 402, and the third electronic device 403 may receive, from the server 400, the first identification information and the first event information regarding the first virtual object and the third identification information and the third event information regarding the first virtual object. For example, the first event information and the third event information may refer to information corresponding to an input to the first virtual object. According to an embodiment, the server 400 may identify whether the number of received multiple pieces of identification information is less than or equal to a predetermined number (e.g., two). According to an embodiment, the predetermined number may refer to the number of electronic devices capable of simultaneously executing an event for the first virtual object. According to an embodiment, when it is determined that the number of received first multiple pieces of identification information (e.g., the first identification information and the third identification information) is less than or equal to the predetermined number, the server 400 may transmit all of the received first multiple pieces of identification information to multiple electronic devices connected to the server 400. For example, when the number of received first multiple pieces of identification information exceeds the predetermined number, second multiple pieces of identification information, excluding identification information (or pieces of identification information) of an electronic device (or electronic devices) corresponding to the exceeded number, may be transmitted to multiple connected electronic devices.

According to an embodiment, in operation 857, the first electronic device 401 may compare the first identification information of the first electronic device 401 transmitted to the server 400 with the pieces of identification information received from the server 400 and identify that identification information matching the first identification information is included in the received pieces of identification information.

According to an embodiment, at operation 859, the third electronic device 403 may compare the third identification information of the third electronic device 403 transmitted to the server 400 with the pieces of identification information received from the server 400 and identify that there is identification information matching the third identification information is included in the received pieces of identification information.

According to an embodiment, in operation 861, the second electronic device 402 may display the first virtual object in an inactive state through a display. According to an embodiment, the second electronic device 402 may identify whether the number of received pieces of identification information is less than a predetermined number. For example, the predetermined number may refer to the number of electronic devices capable of simultaneously executing an event for the first virtual object. According to an embodiment, the first electronic device 401 may receive, from the server 400, information indicating that the number of pieces of identification information for which an event for the first virtual object is currently executed is not less than the predetermined number. According to an embodiment, the second electronic device 402 may identify, based on the above information, that the number of received pieces of identification information is not less than the preset number. According to an embodiment, the second electronic device 402 may display the first virtual object in an inactive state, based on the identification that the number of received pieces of identification information (e.g., two) is not less than the predetermined number (e.g., two). Alternatively, the second electronic device 402 may directly determine, based on the pieces of identification information received from the server 400, whether the number of received pieces of identification information is less than the predetermined number.

According to an embodiment, in operation 863, the first electronic device 401 may execute a first event for the first virtual object. According to an embodiment, the first electronic device 401 may execute the first event based on identifying identification information matching the first identification information from among received multiple pieces of identification information. For example, when the first event is executed, the first electronic device 401 may perform an event related to a writing action using a virtual pointer displayed through a display.

According to an embodiment, in operation 865, the first electronic device 401 may end the execution of the first event for the first virtual object. For example, ending the execution of the first event may imply ending the event related to the writing action using the virtual pointer.

According to an embodiment, in operation 867, the third electronic device 403 may execute a third event for the first virtual object. According to an embodiment, the third electronic device 403 may execute the third event based on identifying identification information matching the third identification information from among the received multiple pieces of identification information. For example, when the third event is executed, the third electronic device 403 may perform an event related to a writing action using a virtual pointer displayed through a display.

According to an embodiment, in operation 869, the first electronic device 401 may transmit, to the server 400, information indicating that the execution of the first event has ended.

According to an embodiment, in operation 871, the server 400 may identify that the execution of the first event for the first virtual object by the first electronic device 401 has ended.

According to an embodiment, in operation 873, the server 400 may delete, from a memory 420 (e.g., the memory 420 in FIG. 4A), the first event information and the first identification information of the first electronic device 401 that has ended the execution of the event for the first virtual object.

According to an embodiment, in operation 875, the server 400 may transmit, to the first electronic device 401, the second electronic device 402, and the third electronic device 403, the third identification information and third event information regarding the first virtual object of the third electronic device 403 for which the event is currently running.

According to an embodiment, in operation 877, the first electronic device 401 may display the first virtual object in an active state through the display 414, based on identifying that the number of pieces of identification information received from the server 400 is less than the predetermined number (e.g., two). According to an embodiment, the first electronic device 401 may receive, from the server 400, information indicating that the number of pieces of identification information received by the server 400 is less than the predetermined number (e.g., two). According to an embodiment, the first electronic device 401 may directly determine, based on the identification information received from the server 400, whether the number of received pieces of identification information is less than the predetermined number (e.g., two).

According to an embodiment, the first electronic device 401 may display the first virtual object in an inactive state through the display 414, based on identifying that the number of pieces of identification information received from the server 400 is greater than the predetermined number.

According to an embodiment, the above-described operations performed by the second electronic device 402 and the third electronic device 403 may also be performed by the first electronic device 401. However, a description of the first electronic device 401 performing the above-described operations of the second electronic device 402 and the third electronic device 403 is redundant and will be omitted.

The first electronic device 401, the second electronic device 402, and the third electronic device 403 may perform the above-described operations of the server 400. However, a description of the first electronic device 401, the second electronic device 402, and the third electronic device 403 performing the above-described operations of the server 400 is redundant and will be omitted.

Figure 9A:
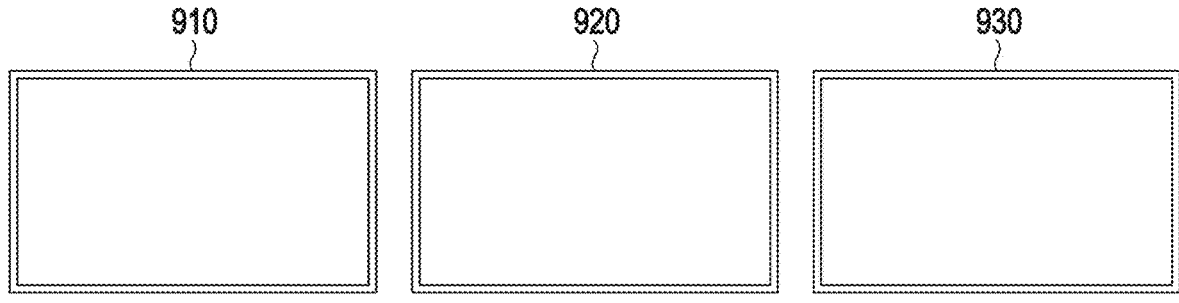
FIG. 9A is a view in which a first electronic device, a second electronic device, and a third electronic device display a first virtual object in an active state according to an embodiment of the disclosure.

FIG. 9A is a view in which a first electronic device, a second electronic device, and a third electronic device display a first virtual object in an active state according to an embodiment of the disclosure.

Referring to FIG. 9A, a server 400 (e.g., the server 400 in FIG. 4A) may control multiple electronic devices, the number of which is predetermined, such that the multiple electronic devices may simultaneously execute events for the first virtual object. For example, the predetermined number may be two.

According to an embodiment, a first electronic device 401 (e.g., the first electronic device 401 in FIG. 4B), a second electronic device 402 (e.g., the second electronic device 402 in FIG. 4B), and a third electronic device 403 (e.g., the third electronic device 403 in FIG. 4B) may be connected to a server 400 (e.g., the server 400 in FIG. 4B).

According to an embodiment, the server 400 may identify that there is no input to the first virtual object, based on not receiving multiple pieces of event information and multiple pieces of identification information of the first electronic device 401, the second electronic device 402, and the third electronic device 403.

According to an embodiment, the server 400 may identify that the number of multiple pieces of identification information received from multiple electronic devices connected to the server 400 (e.g., zero) is less than or equal to a predetermined number (e.g., two). Each of the first electronic device 401, the second electronic device 402, and the third electronic device 403 may receive, from the server 400, information indicating that the number of multiple pieces of identification information received by the server 400 (e.g., zero) is less than or equal to the predetermined number (e.g., two). Based on the above information, the first electronic device 401, the second electronic device 402, and the third electronic device 403 may display first virtual objects 910, 920, and 930 in an active state through displays, respectively.

Figure 9B:
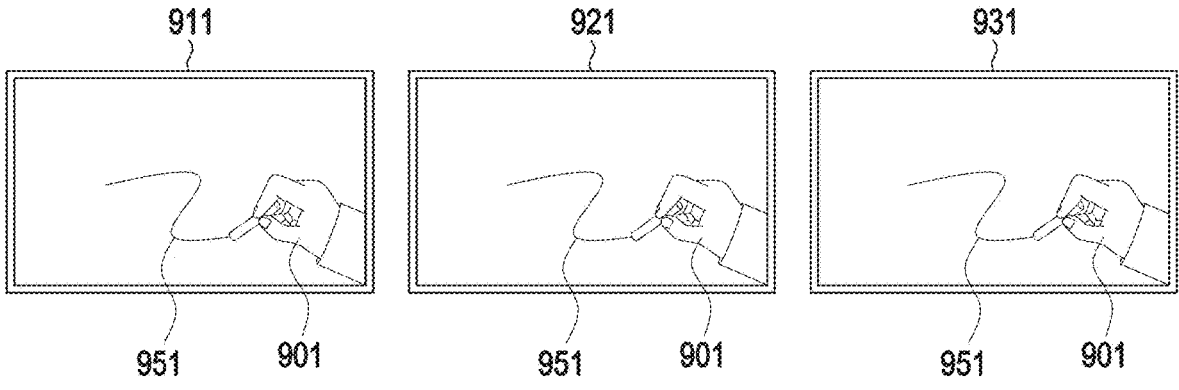
FIG. 9B illustrates a state in which a first electronic device executes a first event for a first virtual object according to an embodiment of the disclosure.

FIG. 9B illustrates a state in which a first electronic device executes a first event for a first virtual object according to an embodiment of the disclosure.

Referring to FIG. 9B, according to an embodiment, a first electronic device 401 (e.g., the first electronic device 401 in FIG. 4B) may identify an input to a first virtual object. According to an embodiment, the first electronic device 401 may identify whether the first virtual object is in an active state. According to an embodiment, the first electronic device 401 may transmit, based on a first virtual object 911 being in an active state, first identification information and first event information regarding the first virtual object (e.g., information about touch input of the first electronic device 401 to the first virtual object) to a server 400. According to an embodiment, the server 400 may identify whether the number of pieces of identification information received from at least one electronic device connected to the server 400 (e.g., one) is less than or equal to a predetermined number (e.g., two). When it is identified that the number of received pieces of identification information is less than or equal to the predetermined number (e.g., two), the server 400 may transmit the first event information and the first identification information of the first electronic device 401 to the first electronic device 401, a second electronic device 402 (e.g., the second electronic device 402 in FIG. 4B), and a third electronic device 403 (e.g., the third electronic device 403 in FIG. 4B). For example, the server 400 may transmit the first identification information and the first event information to the first electronic device 401, the second electronic device 402, and the third electronic device 403, based on the number of received pieces of identification information being one and the predetermined number being two.

According to an embodiment, the second electronic device 402 and the third electronic device 403 may display first virtual objects 921 and 931 in an active state, based on receiving, from the server 400, information indicating that the number of electronic devices currently executing events for the first virtual objects is less than the predetermined number.

According to an embodiment, the first electronic device 401 may execute a first event based on a match between the first identification information and the identification information received from the server 400. For example, when the first event is executed, the first electronic device 401 may perform an event related to a writing action using a virtual pointer 901 displayed on the display 414. According to an embodiment, when the first electronic device 401 executes the event related to the writing action using the virtual pointer 901, the first electronic device 401 may display writing content 951 on the first virtual object 911 through the display 414. According to an embodiment, the server 400 may transmit the writing content 951 to the second electronic device 402 and the third electronic device 403 connected to the server 400. According to an embodiment, the second electronic device 402 and the third electronic device 403 may display, on virtual objects 921 and 931, the writing content 951 based on the execution of the first event by the first electronic device 401.

Figure 9C:
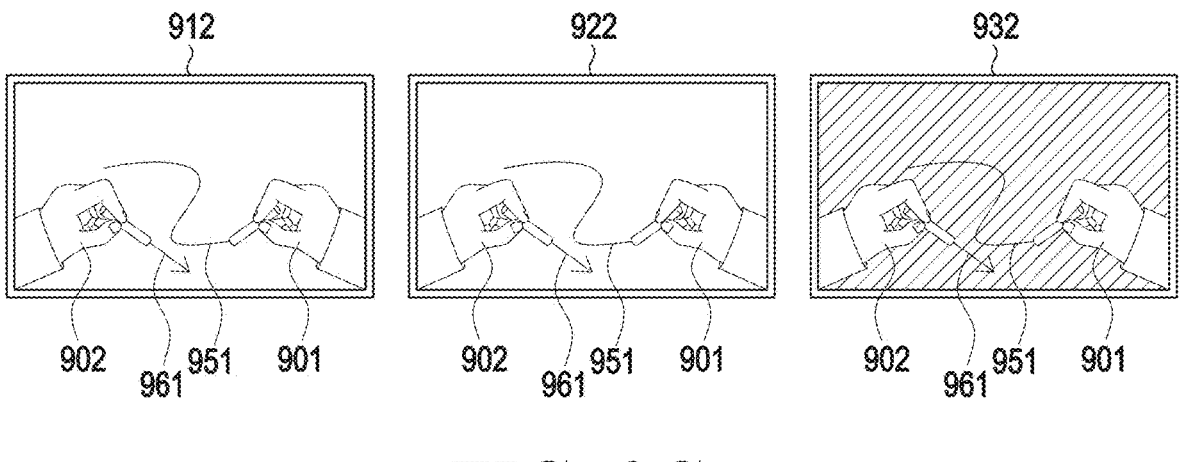
FIG. 9C illustrates a state in which a first electronic device and a second electronic device execute a first event for a first virtual object according to an embodiment of the disclosure.

FIG. 9C illustrates a state in which a first electronic device and a second electronic device execute a first event for a first virtual object according to an embodiment of the disclosure.

Referring to FIG. 9C, after the operations illustrated in FIG. 9B, the second electronic device 402 (e.g., the second electronic device 402 in FIG. 4B) may identify an input to a first virtual object 922.

According to an embodiment, after the first electronic device 401 (e.g., the first electronic device 401 in FIG. 4B) executes a first event for a first virtual object 912, the second electronic device 402 may identify the input to the first virtual object 922. According to an embodiment, the second electronic device 402 may transmit, based on the input to the first virtual object 922, second identification information and second event information regarding the first virtual object 922 (e.g., information about touch input of the second electronic device 402 to the first virtual object 922) to the server 400. According to an embodiment, the server 400 may identify whether the number of pieces of identification information received by the server 400, including identification information of an electronic device in which an event is currently running (e.g., two) is less than or equal to the predetermined number (e.g., two). When it is identified that the number of received pieces of identification information (e.g., two) is less than or equal to the predetermined number (e.g., two), the server 400 may transmit the second event information and the identification information of the second electronic device 402 and the first event information and the identification information of the first electronic device 401 currently executing the first event to the first electronic device 401, the second electronic device 402, and the third electronic device 403.

According to an embodiment, the third electronic device 403 may receive information indicating that the number of multiple pieces of identification information corresponds to the predetermined number (e.g., two). According to an embodiment, the third electronic device 403 may display a first virtual object 932 in an inactive state, based on the number of multiple identification information not being less than the predetermined number (e.g., two).

According to an embodiment, the second electronic device 402 may execute a second event based on a match between the second identification information and the identification information received from the server 400. For example, when the second event is executed, the second electronic device 402 may perform an event related to a writing action using a virtual pointer 902 displayed on a display. According to an embodiment, when the event related to the writing action using the virtual pointer 902 is executed, the second electronic device 402 may display a writing content 961 on the first virtual object 922 through the display. According to an embodiment, based on executing the event related to the writing action using the virtual pointer 902 by the second electronic device 402, the first electronic device 401 may display the writing content 961 by the second electronic device 402 on the first virtual object 912.

According to an embodiment, the third electronic device 403 may display the writing content 961 while displaying the first virtual object 932 in an inactive state.

Figure 9D:
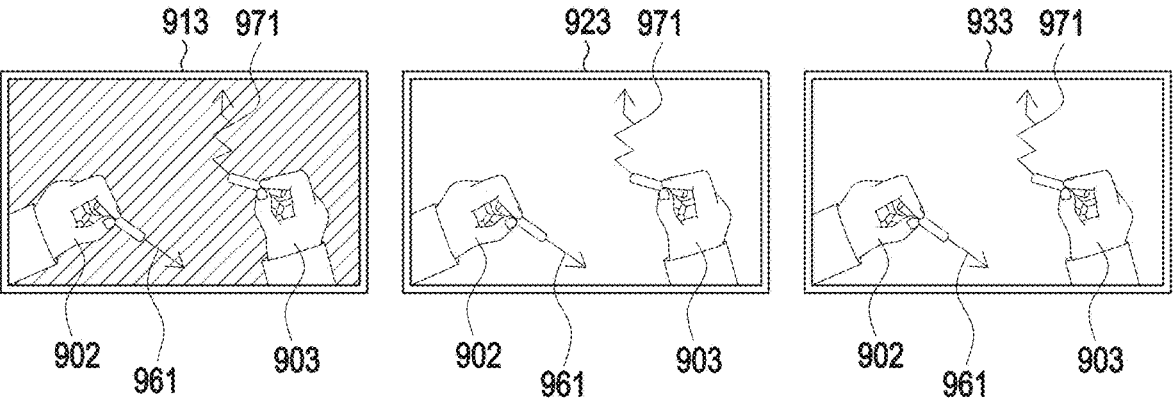
FIG. 9D illustrates an operation in which, after execution of events by a first electronic device and a second electronic device, execution of a first event for a first virtual object by the first electronic device is ended and a second event for the first virtual object by a third electronic device is executed according to an embodiment of the disclosure.

FIG. 9D illustrates an operation in which, after execution of events by a first electronic device and a second electronic device, execution of a first event for a first virtual object by the first electronic device is ended and a second event for the first virtual object by a third electronic device is executed according to an embodiment of the disclosure.

Referring to FIG. 9D, after events are executed by the first electronic device 401 (e.g., the first electronic device 401 in FIG. 4B) and the second electronic device 402 (e.g., the second electronic device 402 in FIG. 4B), the first electronic device 401 may end execution of a first event for a first virtual object 923. For example, based on the termination of execution of an event for a first virtual object 913, the first electronic device 401 may not display a virtual pointer to be displayed on the first virtual object.

According to an embodiment, the server 400 (e.g., the server 400 in FIG. 4B) may transmit, based on ending execution of the event by the first electronic device 401, second event information (e.g., event information corresponding to an input of the second electronic device 402) and second identification information of the second electronic device 402, which is currently executing an event for the first virtual object, to the first electronic device 401, the second electronic device 402, and the third electronic device 403 (e.g., the third electronic device 403 in FIG. 4B).

According to an embodiment, the third electronic device 403 may receive, from the server 400, information indicating that the number of pieces of identification information received by the server 400 (e.g., one) is less than a predetermined number (e.g., two), along with the second identification information and the second event information. According to an embodiment, the third electronic device 403 may display, based on the above information, a first virtual object 933 in an active state.

According to an embodiment, the third electronic device 403 may identify an input to the first virtual object. The third electronic device 403 may transmit, to the server 400, third identification information and third event information regarding the first virtual object (e.g., information about an input of the third electronic device 403 to the first virtual object). According to an embodiment, the server 400 may identify whether the number of pieces of identification information received from at least one electronic device, including the second identification information of the second electronic device 402 in which an event is currently running (e.g., two) is less than or equal to the predetermined number (e.g., two). When it is identified that the number of received pieces of identification information (e.g., two) is less than or equal to the predetermined number (e.g., two), the server 400 may transmit the third event information and the third identification information of the third electronic device 403 and the second identification information and the second event information to the first electronic device 401, the second electronic device 402, and the third electronic device 403. According to an embodiment, the third electronic device 403 may execute a third event based on identifying identification information, which matches the identification information of the third electronic device 403, from among the multiple pieces of identification information received from the server 400.

For example, when the third event is executed, the third electronic device 403 may perform an event related to a writing action using a virtual pointer 903 displayed on the display. According to an embodiment, when the event associated with the writing action is executed using the virtual pointer 903, the third electronic device 403 may display a writing content 971 on the first virtual object 933 through the display. According to an embodiment, the server 400 may transmit the writing content 971 to the first electronic device 401 and the second electronic device 402 connected to the server 400. According to an embodiment, the first electronic device 401 and the second electronic device 402 may display, on the virtual objects 913 and 923, the writing content 971 based on the execution of the third event on the third electronic device 403.

According to an embodiment, the first electronic device 401 may receive, from the server 400, information indicating that the number of pieces of identification information received by the server 400 (e.g., two) is not less than the predetermined number (e.g., two). According to an embodiment, the first electronic device 401 may display, based on the above information, the first virtual object 913 in an inactive state. According to an embodiment, the first electronic device 401 may display the writing contents 961 and 971 on the first virtual object 913 through the display 414 while displaying the first virtual object 913 in the inactive state.

According to an embodiment of the disclosure, a first electronic device may include memory, a communication module, a display, and a processor.

According to an embodiment, wherein the memory stores at least one instruction configured to cause, when executed by the processor, the first electronic device to, perform a connection to a server through the communication module.

According to an embodiment, wherein the memory stores at least one instruction configured to cause, when executed by the processor, the first electronic device to, display a first virtual object through the display, based on information about the first virtual object received from the server.

According to an embodiment, wherein the memory stores at least one instruction configured to cause, when executed by the processor, the first electronic device to, identify a first input to the first virtual object.

According to an embodiment, wherein the memory stores at least one instruction configured to cause, when executed by the processor, the first electronic device to, based on the first input to the first virtual object, identify whether the first virtual object is in an active state.

According to an embodiment, wherein the memory stores at least one instruction configured to cause, when executed by the processor, the first electronic device to, transmit information about a first event corresponding to the first input to the first virtual object and first identification information of the first electronic device to the server when the first virtual object is in the active state.

According to an embodiment, wherein the memory stores at least one instruction configured to cause, when executed by the processor, the first electronic device to, receive, from the server, second identification information of one among a plurality of electronic devices connected to the server and information about a second event for the first virtual object.

According to an embodiment, wherein the memory stores at least one instruction configured to cause, when executed by the processor, the first electronic device to, execute the first event when the second identification information corresponds to the first identification information.

According to an embodiment, wherein the memory stores at least one instruction configured to cause, when executed by the processor, the first electronic device to, when the second identification information corresponds to the first identification information, identify that the first electronic device among the plurality of electronic devices connected to the server has first requested the first input to the first virtual object.

According to an embodiment, wherein the memory stores at least one instruction configured to cause, when executed by the processor, the first electronic device to, when the second identification information does not correspond to the first identification information, identify that a second electronic device among the plurality of electronic devices connected to the server has requested a second input to the first virtual object before the first electronic device.

According to an embodiment, wherein the memory stores at least one instruction configured to cause, when executed by the processor, the first electronic device to, identify, based on the information about the second event, whether the second input to the first virtual object by the second electronic device ends.

According to an embodiment, wherein the memory stores at least one instruction configured to cause, when executed by the processor, the first electronic device to, display the first virtual object in an inactive state through the display when identifying that the second input to the first virtual object by the second electronic device does not end.

According to an embodiment, wherein the memory stores at least one instruction configured to cause, when executed by the processor, the first electronic device to, display the first virtual object in an active state through the display when identifying that the second input to the first virtual object by the second electronic device ends.

According to an embodiment, wherein the memory stores at least one instruction configured to cause, when executed by the processor, the first electronic device to, when identifying that the second electronic device among the plurality of electronic devices connected to the server has requested a second input to the first virtual object before the first electronic device, display the first virtual object in a waiting state to indicate waiting for execution of the first event.

According to an embodiment, wherein the memory stores at least one instruction configured to cause, when executed by the processor, the first electronic device to, in the waiting state, display the second identification information of the second electronic device around the first virtual object.

According to an embodiment, wherein the memory stores at least one instruction configured to cause, when executed by the processor, the first electronic device to, receive, from the server, first multiple pieces of identification information of the plurality of electronic devices when an event related to the first virtual object is simultaneously executed by the plurality of electronic devices.

According to an embodiment, wherein the memory stores at least one instruction configured to cause, when executed by the processor, the first electronic device to, identify identification information corresponding to the first identification information from among the first plurality of pieces of identification information.

According to an embodiment, wherein the memory stores at least one instruction configured to cause, when executed by the processor, the first electronic device to, execute the first event when the identification information matching the first identification information is identified from among the first plurality of pieces of identification information.

According to an embodiment, when the identification information corresponding to the first identification information is not identified from among the first plurality of pieces of identification information, wherein the memory stores at least one instruction configured to cause, when executed by the processor, the first electronic device to, receive second plurality of pieces of identification information of the plurality of electronic devices, excluding identification information of at least one electronic device, in which a third input to the first virtual object has ended, among the plurality of electronic devices.

According to an embodiment, wherein the memory stores at least one instruction configured to cause, when executed by the processor, the first electronic device to, display the first virtual object in an active state through the display when the number of the second plurality of pieces of identification information is less than a predetermined number.

According to an embodiment, wherein the memory stores at least one instruction configured to cause, when executed by the processor, the first electronic device to, display the first virtual object in an inactive state through the display when the number of the second plurality of pieces of identification information is greater than the predetermined number.

According to an embodiment of the disclosure, a method for operating a first electronic device may include performing a connection to a server through a communication module included in the first electronic device.

According to an embodiment, the method for operating the first electronic device may include displaying a first virtual object through a display included in the first electronic device, based on information about the first virtual object received from the server.

According to an embodiment, the method for operating the first electronic device may include identifying a first input to the first virtual object.

According to an embodiment, the method for operating the first electronic device may include identifying, based on the first input to the first virtual object, whether the first virtual object is in an active state.

According to an embodiment, the method for operating the first electronic device may include transmitting a first event corresponding to the first input to the first virtual object and first identification information of the first electronic device to the server when the first virtual object is in the active state.

According to an embodiment, the method for operating the first electronic device may include receiving, from the server, second identification information of one among a plurality of electronic devices connected to the server and information about a second event for the first virtual object.

According to an embodiment, the method for operating the first electronic device may include executing the first event when the second identification information corresponds to the first identification information.

According to an embodiment, the method for operating the first electronic device may include identifying that the first electronic device among the plurality of electronic devices connected to the server has first requested the first input to the first virtual object, when the second identification information corresponds to the first identification information.

According to an embodiment, the method for operating the first electronic device may include identifying that a second electronic device among the plurality of electronic devices connected to the server has requested a second input to the first virtual object before the first electronic device, when the second identification information does not correspond to the first identification information.

According to an embodiment, the method for operating the first electronic device may include identifying, based on the information about the second event, whether the second input to the first virtual object by the second electronic device has ended.

According to an embodiment, the method for operating the first electronic device may include displaying the first virtual object in an inactive state through the display when the second input to the first virtual object by the second electronic device is identified not to have ended.

According to an embodiment, the method for operating the first electronic device may include displaying the first virtual object in an active state through the display when the second input to the first virtual object by the second electronic device is identified to have ended.

According to an embodiment, the method for operating the first electronic device may include displaying the first virtual object in a waiting state to indicate waiting for execution of the first event, when the second electronic device among the plurality of electronic devices connected to the server is identified to have requested a second input to the first virtual object before the first electronic device.

According to an embodiment, the method for operating the first electronic device may include displaying, in the waiting state, the second identification information of the second electronic device around the first virtual object.

According to an embodiment, the method for operating the first electronic device may include receiving, from the server, first plurality of pieces of identification information of the plurality of electronic devices when an event related to the first virtual object is simultaneously executed by the plurality of electronic devices.

According to an embodiment, the method for operating the first electronic device may include identifying identification information corresponding to the first identification information from among the first plurality of pieces of identification information.

According to an embodiment, the method for operating the first electronic device may include executing the first event when the identification information matching the first identification information is identified from among the first plurality of pieces of identification information.

According to an embodiment, the method for operating the first electronic device may include when the identification information corresponding to the first identification information is not identified from among the first plurality of pieces of identification information, receiving second plurality of pieces of identification information of the plurality of electronic devices, excluding identification information of at least one electronic device, in which a third input to the first virtual object ends, among the plurality of electronic devices.

According to an embodiment, the method for operating the first electronic device may include displaying the first virtual object in an active state through the display when a number of the second plurality of pieces of identification information is less than a predetermined number.

According to an embodiment, the method for operating the first electronic device may include displaying the first virtual object in an inactive state through the display when the number of the second plurality of pieces of identification information is greater than the predetermined number.

According to an embodiment of the disclosure, a non-transitory computer-readable recording medium may store at least one instruction to perform a connection to a server through a communication module included in a first electronic device.

According to an embodiment, the non-transitory computer-readable recording medium may store at least one instruction to display a first virtual object through a display included in the first electronic device, based on information about the first virtual object received from the server.

According to an embodiment, the non-transitory computer-readable recording medium may store at least one instruction to identify a first input to the first virtual object.

According to an embodiment, the non-transitory computer-readable recording medium may store at least one instruction to identify, based on the first input to the first virtual object, whether the first virtual object is in an active state.

According to an embodiment, the non-transitory computer-readable recording medium may store at least one instruction to transmit a first event corresponding to the input to the first virtual object and first identification information of the first electronic device to the server when the first virtual object is in the active state.

According to an embodiment, the non-transitory computer-readable recording medium may store at least one instruction to receive, from the server, second identification information of one among a plurality of electronic devices connected to the server and information about a second event for the first virtual object.

According to an embodiment, the non-transitory computer-readable recording medium may store at least one instruction to execute the first event when the second identification information matches the first identification information.

According to an embodiment, the non-transitory computer-readable recording medium may store at least one instruction to, when the second identification information corresponds to the first identification information, identify that the first electronic device among the plurality of electronic devices connected to the server has first requested the first input to the first virtual object.

According to an embodiment, the non-transitory computer-readable recording medium may store at least one instruction to, when the second identification information does not correspond to the first identification information, identify that a second electronic device among the plurality of electronic devices connected to the server has requested a second input to the first virtual object before the first electronic device.

According to an embodiment, the non-transitory computer-readable recording medium may store at least one instruction to, based on the information about the second event, identify whether the second input to the first virtual object by the second electronic device ends.

According to an embodiment, the non-transitory computer-readable recording medium may store at least one instruction to, display the first virtual object in an inactive state through the display when identifying that the second input to the first virtual object by the second electronic device does not end.

According to an embodiment, the non-transitory computer-readable recording medium may store at least one instruction to, display the first virtual object in an active state through the display when identifying that the second input to the first virtual object by the second electronic device ends.

According to an embodiment, the non-transitory computer-readable recording medium may store at least one instruction to, when identifying that the second electronic device among the plurality of electronic devices connected to the server requests a second input to the first virtual object before the first electronic device, display the first virtual object in a waiting state to indicate waiting for execution of the first event.

According to an embodiment, the non-transitory computer-readable recording medium may store at least one instruction to, in the waiting state, display the second identification information of the second electronic device around the first virtual object.

According to an embodiment, the non-transitory computer-readable recording medium may store at least one instruction to, receive, from the server, first plurality of pieces of identification information of the plurality of electronic devices when an event related to the first virtual object is simultaneously executed by the plurality of electronic devices.

According to an embodiment, the non-transitory computer-readable recording medium may store at least one instruction to, identify identification information corresponding to the first identification information from among the first plurality of pieces of identification information.

According to an embodiment, the non-transitory computer-readable recording medium may store at least one instruction to, execute the first event when the identification information corresponding to the first identification information is identified from among the first plurality of pieces of identification information.

According to an embodiment, the non-transitory computer-readable recording medium may store at least one instruction to, when the identification information corresponding to the first identification information is not identified from among the first plurality of pieces of identification information, receive second plurality of pieces of identification information of the plurality of electronic devices, excluding identification information of at least one electronic device, in which a third input to the first virtual object ends, among the plurality of electronic devices.

According to an embodiment, the non-transitory computer-readable recording medium may store at least one instruction to, display the first virtual object in an active state through the display when a number of the second plurality of pieces of identification information is less than a predetermined number.

According to an embodiment, the non-transitory computer-readable recording medium may store at least one instruction to, display the first virtual object in an inactive state through the display when the number of the second plurality of pieces of identification information is greater than the predetermined number.

The electronic device according to various embodiments of the disclosure may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101, 200, 301, 401). For example, a processor (e.g., the processor 120, 411) of the machine (e.g., the electronic device 101, 200, 301, 401) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. A first electronic device comprising:

memory;

communication circuitry;

a display; and a processor, wherein the memory stores at least one instruction configured to cause, when executed by the processor, the first electronic device to:

perform a connection to a server through the communication circuitry, display a first virtual object through the display, based on information about the first virtual object received from the server, identify a first input to the first virtual object, based on the first input to the first virtual object, identify whether the first virtual object is in an active state, transmit information about a first event corresponding to the first input to the first virtual object and first identification information of the first electronic device to the server when the first virtual object is in the active state, receive, from the server, second identification information of at least one among a plurality of electronic devices connected to the server and information about a second event for the first virtual object, and execute the first event when the second identification information corresponds to the first identification information, when the second identification information indicates that a number of at least one electronic device executing at least one event for the first virtual object is less than a predetermined number, display the first virtual object in an active state through the display, and when the second identification information indicates that the number of the at least one electronic device executing the at least one event for the first virtual object is equal to or greater than the predetermined number, display the first virtual object in an inactive state through the display.

2. The electronic device of claim 1, wherein the memory stores at least one instruction configured to cause, when executed by the processor, the first electronic device to, when the second identification information corresponds to the first identification information, identify that the first electronic device among the plurality of electronic devices connected to the server has first requested the first input to the first virtual object.

3. The electronic device of claim 1, wherein the memory stores at least one instruction configured to cause, when executed by the processor, the first electronic device to, when the second identification information does not correspond to the first identification information, identify that a second electronic device among the plurality of electronic devices connected to the server has requested a second input to the first virtual object before the first electronic device.

4. The electronic device of claim 3, wherein the memory stores at least one instruction configured to cause, when executed by the processor, the first electronic device to, based on the information about the second event, identify whether the second input to the first virtual object by the second electronic device ends.

5. The electronic device of claim 4, wherein the memory stores at least one instruction configured to cause, when executed by the processor, the first electronic device to:

display the first virtual object in an inactive state through the display when identifying that the second input to the first virtual object by the second electronic device does not end, and display the first virtual object in an active state through the display when identifying that the second input to the first virtual object by the second electronic device ends.

6. The electronic device of claim 3, wherein the memory stores at least one instruction configured to cause, when executed by the processor, the first electronic device to, when identifying that the second electronic device among the plurality of electronic devices connected to the server requests a second input to the first virtual object before the first electronic device, display the first virtual object in a waiting state to indicate waiting for execution of the first event.

7. The electronic device of claim 6, wherein the memory stores at least one instruction configured to cause, when executed by the processor, the first electronic device to, in the waiting state, display the second identification information of the second electronic device around the first virtual object.

8. The electronic device of claim 1, wherein the memory stores at least one instruction configured to cause, when executed by the processor, the first electronic device to receive, from the server, the second identification information indicating a plurality of electronic devices when an event related to the first virtual object is simultaneously executed by the plurality of electronic devices.

9. The electronic device of claim 8, wherein the memory stores at least one instruction configured to cause, when executed by the processor, the first electronic device to;

identify identification information corresponding to the first identification information from the second identification information, and execute the first event when the identification information corresponding to the first identification information is identified from the second identification information.

10. An operation method of a first electronic device, the operation method comprising:

performing a connection to a server through communication circuitry included in the first electronic device;

displaying a first virtual object through a display included in the first electronic device, based on information about the first virtual object received from the server;

identifying a first input to the first virtual object;

based on the first input to the first virtual object, identifying whether the first virtual object is in an active state;

transmitting, to the server, a first event corresponding to the first input to the first virtual object and first identification information of the first electronic device when the first virtual object is in the active state;

receiving, from the server, second identification information of at least one among a plurality of electronic devices connected to the server and information about a second event for the first virtual object; and executing the first event when the second identification information corresponds to the first identification information, when the second identification information indicates that a number of at least one electronic device executing at least one event for the first virtual object is less than a predetermined number, displaying the first virtual object in an active state through the display, and when the second identification information indicates that the number of the at least one electronic device executing the at least one event for the first virtual object is equal to or greater than the predetermined number, displaying the first virtual object in an inactive state through the display.

11. The operation method of claim 10, further comprising identifying that the first electronic device among the plurality of electronic devices connected to the server has first requested the first input to the first virtual object, when the second identification information corresponds to the first identification information.

12. The operation method of claim 10, further comprising identifying that a second electronic device among the plurality of electronic devices connected to the server has requested a second input to the first virtual object before the first electronic device, when the second identification information does not correspond to the first identification information.

13. The operation method of claim 12, further comprising, based on the information about the second event, identifying, whether the second input to the first virtual object by the second electronic device ends.

14. The operation method of claim 13, further comprising:
displaying the first virtual object in an inactive state through the display when identifying that the second input to the first virtual object by the second electronic device does not end; and
displaying the first virtual object in an active state through the display when identifying that the second input to the first virtual object by the second electronic device ends.

15. The operation method of claim 12, further comprising displaying the first virtual object in a waiting state to indicate waiting for execution of the first event, when identifying that the second electronic device among the plurality of electronic devices connected to the server requests a second input to the first virtual object before the first electronic device.

16. The operation method of claim 15, further comprising displaying, in the waiting state, the second identification information of the second electronic device around the first virtual object.

17. The operation method of claim 10, further comprising receiving, from the server, the second identification information indicating a plurality of electronic devices when an event related to the first virtual object is simultaneously executed by the plurality of electronic devices.

18. The operation method of claim 17, further comprising:
identifying identification information corresponding to the first identification information from the second identification information; and
executing the first event when the identification information corresponding to the first identification information is identified from the second identification information.

19. A non-transitory computer-readable recording medium configured to store at least one instruction to:
perform a connection to a server through communication circuitry included in a first electronic device;
display a first virtual object through a display included in the first electronic device, based on information about the first virtual object received from the server;
identify a first input to the first virtual object;
based on the first input to the first virtual object, identify whether the first virtual object is in an active state;
transmit, to the server, a first event corresponding to the first input to the first virtual object and first identification information of the first electronic device when the first virtual object is in the active state;
receive, from the server, second identification information of at least one among a plurality of electronic devices connected to the server and information about a second event for the first virtual object; and
execute the first event when the second identification information corresponds to the first identification information,
when the second identification information indicates that a number of at least one electronic device executing at least one event for the first virtual object is less than a predetermined number, display the first virtual object in an active state through the display, and
when the second identification information indicates that the number of the at least one electronic device executing the at least one event for the first virtual object is equal to or greater than the predetermined number, display the first virtual object in an inactive state through the display.

* * * * *